US012085690B2

(12) United States Patent
Miller et al.

(10) Patent No.: US 12,085,690 B2
(45) Date of Patent: Sep. 10, 2024

(54) SYSTEM AND METHOD FOR PRESENTING AVIATION-FOCUSED WEATHER INFORMATION

(71) Applicant: The Boeing Company, Chicago, IL (US)

(72) Inventors: Jason Andrew Miller, Austin, TX (US); Christopher Tyson Weihs, Houston, TX (US); Kathryn Bauer Thomas, Portland, ME (US); Malcolm Toon, Cape Elizabeth, ME (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/660,766

(22) Filed: Apr. 26, 2022

(65) Prior Publication Data

US 2022/0342117 A1 Oct. 27, 2022

Related U.S. Application Data

(60) Provisional application No. 63/179,985, filed on Apr. 26, 2021.

(51) Int. Cl.
*G01W 1/10* (2006.01)
*B64D 43/00* (2006.01)
*G01W 1/00* (2006.01)

(52) U.S. Cl.
CPC .............. *G01W 1/10* (2013.01); *B64D 43/00* (2013.01); *G01W 2001/003* (2013.01)

(58) Field of Classification Search
CPC ... G01W 1/10; G01W 1/02; G01W 2001/003; G01W 2001/006; G01W 2203/00;
(Continued)

(56) References Cited

U.S. PATENT DOCUMENTS

D570,858 S 6/2008 Loehr et al.
D638,842 S 5/2011 Woods et al.
(Continued)

FOREIGN PATENT DOCUMENTS

WO 9316814 A1 9/1993
WO 2014047171 A1 3/2014
(Continued)

OTHER PUBLICATIONS

ForeFlight Intelligent Apps for Pilots (Ed.). (Apr. 20, 2021). Pilot's Guide to ForeFlight Mobile. ForeFlight. Retrieved Mar. 5, 2023, from https://web.archive.org/web/20210420140610/http://cloudfront.foreflight.com/docs/ff/13.2/v13.2%20-%20foreflight%20mobile%20pilot%20guide%20optimized.pdf (Year: 2021).*
(Continued)

*Primary Examiner* — Lisa M Caputo
*Assistant Examiner* — Eric Sebastian Von Wald
(74) *Attorney, Agent, or Firm* — Neal, Gerber & Eisenberg LLP

(57) ABSTRACT

Systems and methods for assessing and presenting aviation-focused weather information are provided. One computer-implemented method comprises receiving, at one or more processors, weather information for a select geographic location and a select time period, the select time period comprising a plurality of consecutive hours, and the weather information including general weather conditions and aviation-specific weather conditions for each of the hours; and displaying, on a display unit of an electronic device, a weather forecast user interface configured to present the weather information, wherein the weather forecast user interface comprises a first region configured to depict one or more of the aviation-specific weather conditions for each hour of the select time period using color-coding or shading
(Continued)

associated with the corresponding aviation-specific weather condition.

16 Claims, 13 Drawing Sheets

(58) Field of Classification Search
CPC ............ G01C 21/3691; G05D 1/1062; G01D 2204/14; G05B 2219/32128; G05B 2219/13144; G06F 2209/545; G06F 2206/1008; G06F 3/048; B64D 43/00; B64D 45/00; H04N 21/4886; Y10S 706/931

See application file for complete search history.

(56) References Cited

U.S. PATENT DOCUMENTS

| | | | |
|---|---|---|---|
| D642,188 S | 7/2011 | Pearson et al. | |
| D684,583 S | 6/2013 | Brinda et al. | |
| D694,254 S | 11/2013 | Brinda et al. | |
| D695,775 S | 12/2013 | Brinda et al. | |
| D721,727 S | 1/2015 | Koehn et al. | |
| D730,925 S | 6/2015 | Lin | |
| D753,135 S | 4/2016 | Vazquez | |
| D757,075 S | 5/2016 | Blank et al. | |
| 9,336,379 B2 | 5/2016 | Colvin et al. | |
| D759,692 S | 6/2016 | Yamazaki et al. | |
| D766,258 S | 9/2016 | Wang et al. | |
| 9,467,848 B1 | 10/2016 | Song et al. | |
| D773,497 S | 12/2016 | Andress et al. | |
| D781,901 S | 3/2017 | Gandhi et al. | |
| D783,648 S | 4/2017 | Vazquez et al. | |
| D808,406 S | 1/2018 | Lee et al. | |
| D824,953 S | 8/2018 | Butcher et al. | |
| D838,291 S | 1/2019 | Mcglasson et al. | |
| D848,468 S | 5/2019 | Ng et al. | |
| 10,297,160 B1* | 5/2019 | O'Leary | B64D 45/00 |
| D892,142 S | 8/2020 | Clifford et al. | |
| D894,225 S | 8/2020 | Butcher et al. | |
| D897,365 S | 9/2020 | Dye et al. | |
| D900,141 S | 10/2020 | Saltik | |
| D900,142 S | 10/2020 | Saltik | |
| D900,143 S | 10/2020 | Saltik | |
| D914,747 S | 3/2021 | Butcher et al. | |
| D916,912 S | 4/2021 | Mcglasson et al. | |
| D930,687 S | 9/2021 | Butcher et al. | |
| D946,023 S | 3/2022 | Nuttbrown et al. | |
| D953,363 S | 5/2022 | Befort et al. | |
| D957,416 S | 7/2022 | Everhart et al. | |
| D977,498 S | 2/2023 | Miller et al. | |
| D983,217 S | 4/2023 | Depodwin et al. | |
| D983,227 S | 4/2023 | Miller et al. | |
| D983,831 S | 4/2023 | Miller et al. | |
| D983,832 S | 4/2023 | Miller et al. | |
| D983,833 S | 4/2023 | Miller et al. | |
| D989,797 S | 6/2023 | Montgomery et al. | |
| D990,504 S | 6/2023 | Montgomery et al. | |
| 2003/0008711 A1 | 1/2003 | Corbo | |
| 2006/0121433 A1 | 6/2006 | Adams | |
| 2008/0046803 A1 | 2/2008 | Beauchamp et al. | |
| 2011/0022294 A1* | 1/2011 | Apley | G08G 5/0013 701/532 |
| 2012/0047461 A1 | 2/2012 | Colvin et al. | |
| 2012/0232785 A1* | 9/2012 | Wiesemann | G08G 5/0021 701/423 |
| 2013/0069893 A1 | 3/2013 | Brinda et al. | |
| 2014/0039734 A1* | 2/2014 | Ramaiah | G08G 5/0091 701/14 |
| 2014/0082536 A1 | 3/2014 | Costa et al. | |
| 2014/0258901 A1 | 9/2014 | Cho | |
| 2015/0127263 A1* | 5/2015 | Praun | H04L 51/222 702/3 |
| 2015/0248534 A1 | 9/2015 | Krzywicki et al. | |
| 2016/0231912 A9 | 8/2016 | Costa et al. | |
| 2016/0248900 A1 | 8/2016 | Kim et al. | |
| 2016/0307274 A1 | 10/2016 | Sweeney et al. | |
| 2016/0309321 A1 | 10/2016 | Song et al. | |
| 2020/0168103 A1* | 5/2020 | Holder | G06F 3/0482 |

FOREIGN PATENT DOCUMENTS

| | | |
|---|---|---|
| WO | 2015105257 A1 | 7/2015 |
| WO | 2016168519 A1 | 10/2016 |

OTHER PUBLICATIONS

B.V. Buienradar: "Buienradar—weer", May 5, 2017 (May 5, 2017), XP055498410, Retrieved from the Internet: URL:https://web.archive.org/web/20170505002736/https://play.google.com/store/apps/details?id=com.supportware.Buienradar&hl=en [retrieved on Aug. 8, 2018].

Martin Brinkmann: "WeatherBomb is a fancy weather app for Android that highlights weather trends", May 21, 2013 (May 21, 2013 ), XP055498408, Retrieved from the Internet: URL:https://www.ghacks.net/2013/05/21/weatherbomb-is-a-fancy-weather-app-for-android-that-highlights-weather-trends/ [retrieved on Aug. 8, 2018].

Extended European Search Report for EP Patent Application No. 22169596.8, mailed Sep. 8, 2022, 8 pages.

* cited by examiner

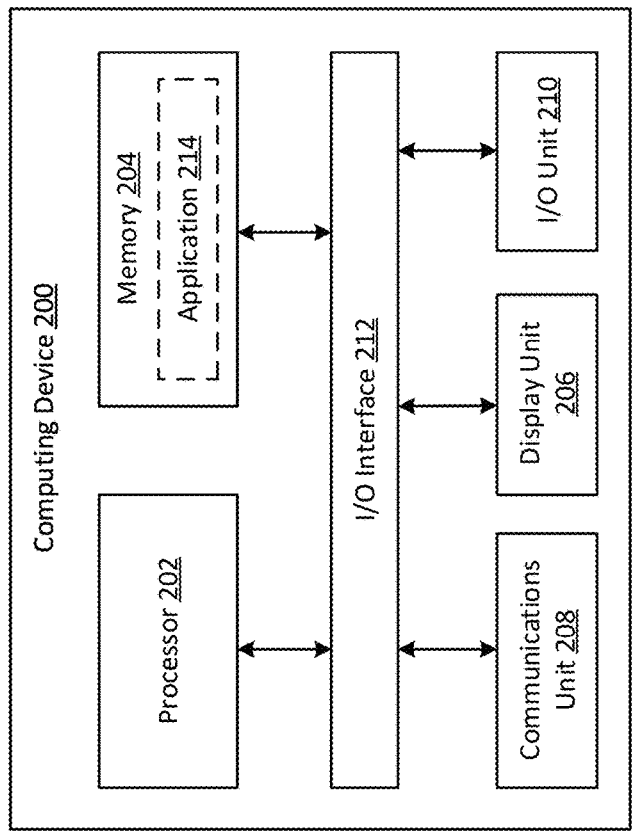
FIG. 1
FIG. 2
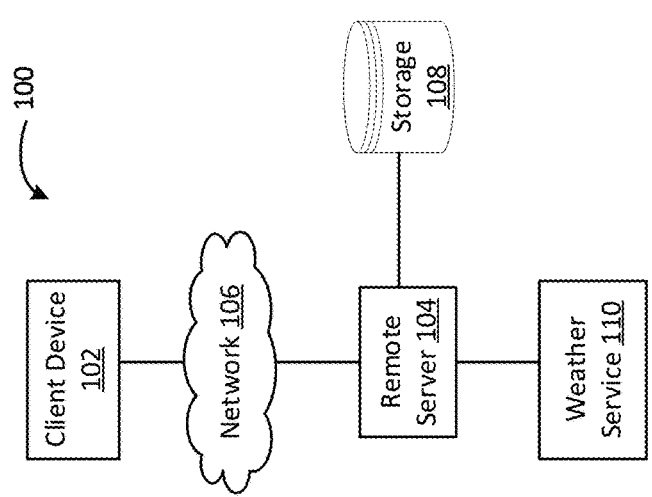
| Display Color | Ceiling Criteria | Visibility Criteria | Flight Condition |
|---|---|---|---|
| Magenta | below 500 feet | less than 1 mile | Low Instrument Flight Rules ("LIFR") |
| Red | 500 to 1,000 feet | less than 1 to 3 miles | Instrument Flight Rules ("IFR") |
| Blue | 1,000 to 3,000 feet | less than 3 to 5 miles | Marginal Visual Flight Rules ("MVFR") |
| Green | greater than 3,000 feet | greater than 5 miles | Visual Flight Rules ("VFR") |
FIG. 10

450

| | Close | DLLAN | Just Updated |
|---|---|---|---|

Cloudy

| MVFR | 2,800' | 10 sm |
|---|---|---|
| FLIGHT CATEGORY | CEILING | VISIBILITY |
| 34°F (1°C) | 062° @ 9 kts | 30.00 |
| TEMPERATURE | WIND (KTS) | ALTIMETER |
| 24°F / 66% | -749' | 7% |
| DEWPT/HUMIDITY | DENSITY ALT | PRECIP |

Wednesday, Dec 16, 1:00 PM CST

| 1PM | 2PM | 3PM | 4PM | 5PM | 6PM | 7 |
|---|---|---|---|---|---|---|
| MVFR | MVFR | MVFR | MVFR | MVFR | VFR | |
| 2,800' | 2,700' | 2,700' | 2,700' | 2,700' | 3,000' | 3, |
| CEILING | CEILING | CEILING | CEILING | CEILING | CEILING | C |
| 10 sm | 10 sm | 9 sm | 8 sm | 8 sm | 7 sm | 7 |
| 062° 9 kts | 051° 8 kts | 043° 8 kts | 033° 6 kts | 032° 5 kts | 034° 5 kts | |
| 34°F | 34°F | 34°F | 32°F | 31°F | 31°F | |
| ◊7% | ◊8% | ◊7% | ◊7% | ◊8% | ◊10% | |

| Wed 16 | Thu 17 | Fri 18 | Sat 19 | Sun |
|---|---|---|---|---|
| 36°/29° | 35°/23° | 38°/34° | 39°/26° | 35°/3 |

FIG. 4B

SYSTEM AND METHOD FOR PRESENTING AVIATION-FOCUSED WEATHER INFORMATION

CROSS-REFERENCE

This application claims the benefit of U.S. Provisional Patent Application No. 63/179,985 filed on Apr. 26, 2021, the contents of which are incorporated by reference herein in their entirety.

TECHNICAL FIELD

The present disclosure generally relates to presentment of weather information and more specifically to a system, method, and graphical user interface for presenting aviation-focused weather information.

BACKGROUND

Weather information plays a vital role in the planning and execution of flight operations. Initially, the trajectory for a flight plan may be selected based on forecasted weather conditions for various waypoints along the route. When actual weather conditions along the route differ from the forecasted conditions, the flight trajectory may need to be re-calculated en route, thus resulting in various inefficiencies, such as, for example, delay in flight time and increased fuel consumption and emissions.

The weather information used for flight planning and operations may include aviation-specific weather information, such as, e.g., ceiling, visibility, density altitude, altimeter, and turbulence, as well as general weather information, such as, e.g., temperature, precipitation, pressure, humidity, and wind speed and direction. Existing flight planning tools receive weather information from various sources, including, for example, observational products, such as ground-based radar (e.g., NEXRAD), satellite imagery, pilot weather reports (e.g., "PIREPs"), and meteorological aerodrome reports ("METARs"), and forecasting products, such as prog charts, terminal aerodrome forecasts ("TAFs"), Model Output Statistics ("MOS"), and the area forecast ("FA") and AIRMET Sierra bulletin.

The weather information provided by these sources is largely text-based and may be presented in a similar format by some flight planning tools. Moreover, certain pieces of weather information (e.g., ceiling or visibility) may be forecasted at set intervals of time only (e.g., every three hours), for a short time span (e.g., one to two days), and/or for a general area that is not tied to a specific town, airport, or other site. In such cases, the weather forecast for a specific location and time may not be readily obtained using flight planning tools. Rather, the user may have to deduce the desired weather forecast for themselves from the received textual information. Despite these drawbacks, flight crew continue to use existing flight planning tools to obtain weather forecast information at least because conventional weather forecasting products can only access general weather information and therefore, do not contain the aviation-specific weather information needed for flight planning purposes.

Accordingly, there is still a need in the art for a weather forecasting tool for planning flight operations that is capable of providing accurate and up-to-date weather forecasts for a specified location and time in a readily discernable format.

SUMMARY

The invention is intended to solve the above-noted problems by providing systems and methods that are designed, among other things, to: (1) assess aviation-focused weather information for a select location and time period to identify one or more aviation-specific weather conditions for respective hours of the select time period; (2) present the aviation-focused weather information in an intuitive, graphical format that uses color-coding or shading to symbolize the identified aviation-specific weather conditions; and (3) generate a graphical user interface ("GUI") for presenting the aviation-focused weather information within a flight planning software product.

One example embodiment provides a computer-implemented method for assessing and presenting aviation-focused weather information, the method comprising: receiving, at one or more processors, weather information for a select geographic location and a select time period, the select time period comprising a plurality of consecutive hours, and the weather information including general weather conditions and aviation-specific weather conditions for each of the hours; and displaying, on a display unit of an electronic device, a weather forecast user interface configured to present the weather information, wherein the weather forecast user interface comprises a first region configured to depict one or more of the aviation-specific weather conditions for each hour of the select time period using color-coding or shading associated with the corresponding aviation-specific weather condition.

Another example embodiment provides a non-transitory computer readable storage medium storing one or more programs, the one or more programs comprising instructions which, when executed by an electronic device with a display unit, cause the electronic device to: receive weather information for a select geographic location and a select time period, the select time period comprising a plurality of consecutive hours, and the weather information including general weather conditions and aviation-specific weather conditions for each of the hours; and display a weather forecast user interface configured to present the weather information, wherein the weather forecast user interface comprises a first region configured to depict one or more of the aviation-specific weather conditions for each hour of the select time period using color-coding or shading associated with the corresponding aviation-specific weather condition.

Yet another example embodiment provides a system for assessing and presenting aviation-focused weather information, the system comprising a display unit; one or more processors; and memory configured to store one or more programs, the one or more programs being configured for execution by the one or more processors and including instructions for: receiving, at the one or more processors, weather information for a select geographic location and a select time period, the select time period comprising a plurality of consecutive hours, and the weather information including general weather conditions and aviation-specific weather conditions for each of the hours; and displaying, on the display unit, a weather forecast user interface configured to present the weather information, wherein the weather forecast user interface comprises a first region configured to depict one or more of the aviation-specific weather conditions for each hour of the select time period using color-coding or shading associated with the corresponding aviation-specific weather condition.

These and other embodiments, and various permutations and aspects, will become apparent and be more fully understood from the following detailed description and accompanying drawings, which set forth illustrative embodiments that are indicative of the various ways in which the principles of the invention may be employed.

BRIEF DESCRIPTION OF THE DRAWINGS

FIG. 1 is a block diagram of an exemplary networked system capable of implementing aspects of the embodiments described herein.

FIG. 2 is a block diagram of an exemplary computing device capable of implementing aspects of the embodiments described herein.

FIGS. 4A and 4B are screenshots of an exemplary graphical user interface (GUI) for presenting aviation-focused weather information in an hourly format, rendered on different electronic devices, in accordance with embodiments.

FIG. 10 is a table illustrating exemplary color-coding rules used to implement aspects of the embodiments described herein.

DETAILED DESCRIPTION OF EXAMPLE EMBODIMENTS

Figure 3:
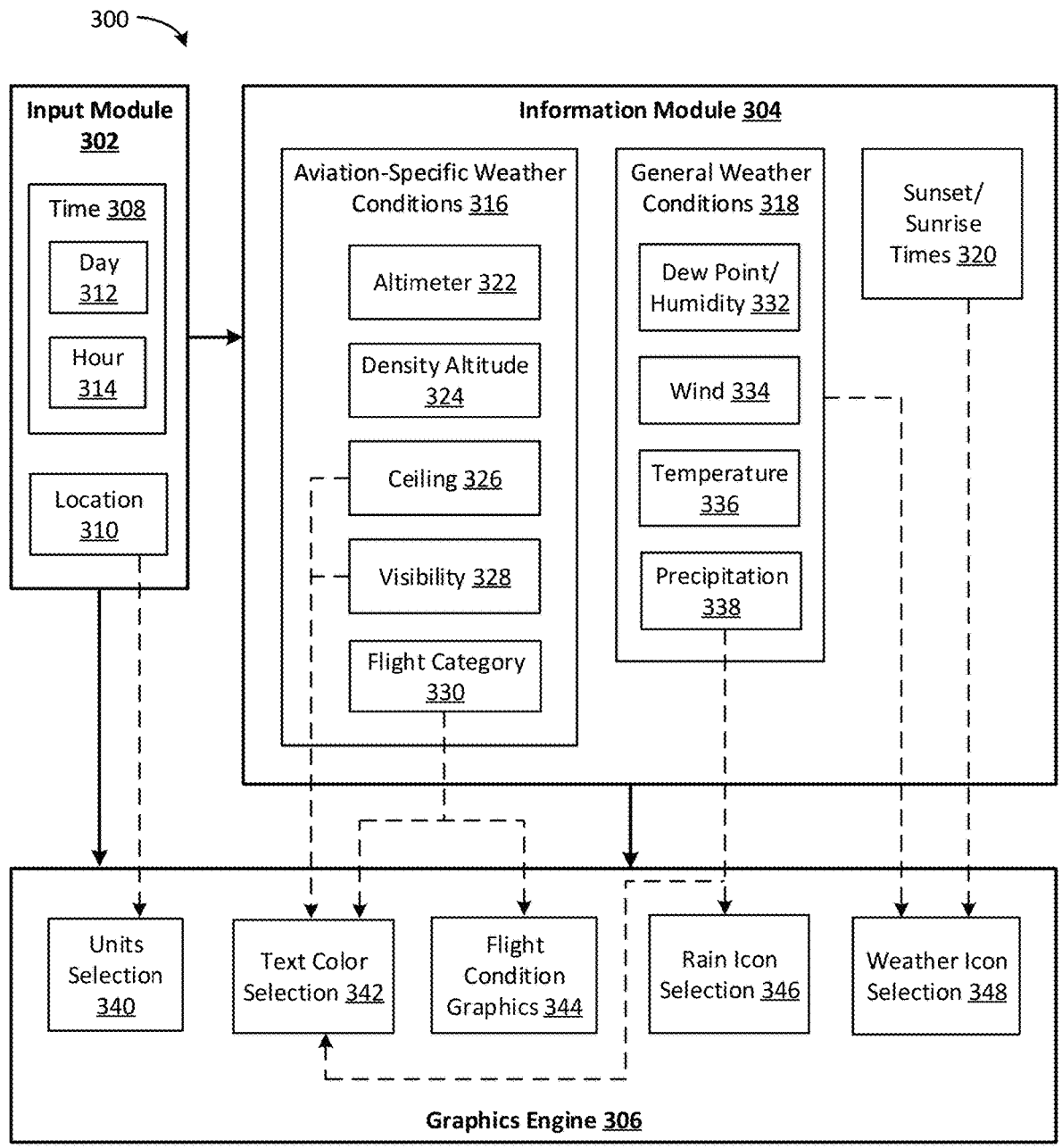
FIG. 3 is a block diagram of an exemplary aviation-focused weather forecasting system in accordance with embodiments.

The description that follows describes, illustrates, and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. In addition, system components can be variously arranged, as known in the art. Also, the drawings set forth herein are not necessarily drawn to scale, and in some instances, proportions may be exaggerated to more clearly depict certain features and/or related elements may be omitted to emphasize and clearly illustrate the novel features described herein. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

Systems and methods are provided herein for assessing and presenting aviation-focused weather information for a select geographic location and time period in an intuitive, graphical format on a display unit of an electronic device. The weather information may include hourly forecasts for aviation-specific weather conditions, as well as general weather conditions. Exemplary embodiments include a user interface, such as a graphical user interface ("GUI"), that may be included in a flight planning software product, such as, e.g., ForeFlight, or other software running on the electronic device. The user interface may be configured to present the weather information in multiple layers or regions, with each region providing a different level of informational detail (e.g., quick summary, daily synopses, hourly breakdowns, detailed hour view, etc.). The user interface may be further configured to use color-coding or shading, graphical icons, and/or other graphics to symbolize select weather conditions, including one or more of the aviation-specific weather conditions, in a consistent and easily-discernible manner. The user interface may also include interactive or user-controllable components (e.g., scrollable features, selectable elements, etc.) to allow user selection of the hours and/or days on display. These and another features of the user interface, and the systems and methods for implementing the same, are described herein in more detail.

As used herein, "weather information" pertains to any information related to weather, and in some cases, related environmental conditions. The weather information may be geo-spatially labeled, or associated with a specific geographic location or region. In embodiments, the weather information may be for a particular airport, city or town, landmark, waypoint, set of longitude and latitude coordinates, or the like. In addition, the weather information may be time-encoded, or pertain to weather conditions at a specific point-in-time or time period. In embodiments, the weather information may comprise one or more of current or observed weather information, forecast or predicted weather information, and previous or recorded weather information.

In terms of content, the weather information may comprise aviation-specific weather information including, for example, flight category information, visibility information, cloud ceiling information, density altitude information, altimeter information, turbulence information, icing information, volcanic ash information, lightning information, and any other weather-related information that is specifically relevant to forecasting for flight operations and other in-air situations. The weather information may also comprise general weather information including, for example, temperature information, precipitation information, dew point and humidity information, barometric pressure information, wind information (including wind speed and wind direction), and any other weather-related information that is used for everyday forecasting on the ground.

The weather information may be received from sources situated in the air, such as satellites, aircraft reports, and the like, for example. The weather information may also, or alternatively, be received from sources situated on the ground, such as airports, ground stations, or other local weather sources; a central reporting service or other forecasting service covering multiple locations (e.g., the Aviation Digital Data Service ("ADDS") operated by the National Oceanic and Atmospheric Administration ("NOAA")); a datastore for storing or archiving weather information; and the like, for example. Exemplary weather sources may include, but are not limited to, ground-based radar (e.g., NEXRAD), satellite imagery, pilot weather reports (e.g., "PIREPs"), meteorological aerodrome reports ("METARs"), prog charts, terminal aerodrome forecasts ("TAFs"), Model Output Statistics ("MOS"), significant meteorological information ("SIGMET"), and the area forecast ("FA") and AIRMET Sierra bulletin.

In various embodiments, certain weather information may be presented on a graphical user interface using color-coding to indicate a severity of the corresponding weather conditions. For example, as shown by table 10 of FIG. 10, the color-coding scheme may be used to assign certain colors (e.g., magenta, red, blue, and green) to certain weather conditions (e.g., ceiling, visibility, and flight category) depending on a rating, measurement, or other value associated with the weather condition (e.g., ceiling height, visibility distance, and flight category rating or condition), and in some cases, using one or more criteria for judging a severity of that value (e.g., a numerical range or threshold). In some embodiments, the color-coding scheme may be at least partially based on flight rules and regulations established by the Federal Aviation Administration ("FAA"), as is shown in FIG. 10, for example. Alternatively, the color-coding scheme may be proprietary or any other classification for assigning a particular color to a particular weather condition, and may use other colors (e.g., yellow, orange, etc.) to signify the various conditions. In other embodiments, the graphical user interface may be configured to use shading or styling schemes, in addition to or instead of color-coding, to signify certain weather conditions and their severity (e.g., good, moderate, poor, etc.).

Referring now to FIGS. 1 and 2, shown are exemplary computing environments in which the various embodiments described herein may be implemented. It should be appreciated that FIGS. 1 and 2 are only exemplary and therefore, may be modified as needed, and are not intended to assert or imply any limitation with respect to the environments in which different embodiments may be implemented. In addition, FIGS. 1 and 2 may include other components than what is shown, or fewer components, as will be appreciated.

FIG. 1 illustrates an exemplary networked system 100 for carrying out one or more of the embodiments described herein. The system 100 comprises a plurality of computers or computing devices, including client device 102 and remote server 104, and a communication network 106 for facilitating communication between the computers to form the networked system 100. Communication between the components of the system 100, including the computers and the network 106, may be carried out using wired connections, wireless communications, or both.

In embodiments, the communication network 106 may be the Internet or other global computer network. Each of the client device 102 and the remote server 102 may be configured to use the Internet protocol suite (TCP/IP) to communicate over the network 106. In some embodiments, the communication network 106 may include a number of different types of networks, such as, for example, cellular networks, satellite, an intranet, a wide area network ("WAN"), a local area network ("LAN"), personal area networks (e.g., Bluetooth, near field communication, infrared, etc.), or the like, in addition to or instead of the Internet.

According to embodiments, the client device 102 can be configured to generate, display, or otherwise provide a weather forecast user interface for presenting aviation-focused weather information to a user, in accordance with the techniques described herein. The weather forecast user interface may be a graphical user interface ("GUI") or the like. Exemplary user interfaces include, but are not limited to, user interface 400 shown in FIG. 4A and user interface 450 shown in FIG. 4B. The weather forecast user interface may be integrated into, or form part of, a flight planning software application, which may be executing on one or more of the client device 102 and the remote server 104. The client device 102 can be further configured to communicate with the remote server 104 via the network 106 to implement all or aspects of the weather forecast user interface and/or the flight planning software application. For example, the aviation-focused weather information may be received from the remote server 104 at the client device 102 for presentation thereon.

The client device 102 (also referred to herein as "electronic device") may be any type of computing device capable of displaying the weather forecast user interface and interfacing with the network 106 and/or the remote server 104, including, for example, a mobile communication device (e.g., a smart phone or portable telephone) or any other type of mobile computing device (e.g., a tablet or PDA), and a personal computer (e.g., laptop or desktop). In a preferred embodiment, the electronic device 102 includes a display screen (e.g., display screen 206 shown in FIG. 2) for displaying the weather forecast user interface and one or more input devices (e.g., I/O unit 210 shown in FIG. 2) for receiving inputs from a user of the electronic device 102 in association with the weather forecast user interface.

The remote server 104 can be configured to retrieve, access, or obtain the weather information that is used to generate the weather forecast user interface. In some cases, the remote server 104 may provide said information directly to the client device 102. In other cases, the remoter server 104 may first process the received information and generate all or aspects of the weather forecast user interface ("UI") based thereon before sending the UI to the client device 102. The remote server 104 may be any suitable computer or computing device configured as one or more of a database server, a file server, a web server, a cache server, and an application server, for example. In embodiments, the remote server 104 may be operated by, or affiliated with, an entity that hosts or offers the flight planning software application, or other software application capable of providing or generating the weather forecast user interface for the client device 102.

As shown, the remote server 104 may be connected to, or in communication with, a data storage device 108 and a weather service component 110 for storing and/or obtaining the weather information. The data storage device 108 may be any type of database, datastore, storage unit, or other electronic device capable of storing, archiving, or caching the weather information and/or other types of information received from the remote server 104. The weather service component 110 may be configured to access or receive weather information or data from multiple sources, and process the weather information to provide weather conditions for a specific geospatial location and time. In embodiments, the system 100 may receive current, forecast, or updated weather information from the weather service component 110 and store all received weather information in the data storage device 108 in a cache memory or other memory of the device 108. In some embodiments, the stored weather information may be retrieved from the data storage device 108 and used by the remote server 104 for UI generation when new weather information cannot be obtained from the weather service component 110, such as, for example, during off-line operation. The weather service component 110 may be implemented using one or more servers, computers, databases, or any combination thereof. In some embodiments, the weather service component 110 may be in communication with a third-party service, such as Weather Services International ("WSI") or the like.

Each of the remote server 104, the data storage device 108, and the weather service component 110 may reside in a common location, or at various locations that are connected together by the network 106, a local area network ("LAN"), or other network connection to form a distributed network. In some cases, the data storage device 108 and/or the weather service component 110 may be stored in a memory of the remote server 104. In other cases, the weather service component 110 may be stored in a separate location from the remote server 104 and operated by a third party service (e.g., WSI, etc.). In such cases, the weather service component 110 may use the network 106 to communicate with the remote server 104.

In some embodiments, the system 100 may include software or computer program(s) (not shown) executing on multiple processors to enable interactions between various components of the system 100. For example, such programs may include a web service (e.g., a Simple Object Access Protocol ("SOAP") web service) or the like executing on the remote server 104 for interacting with the client device 102, a mobile application, web application, or the like executing on the client device 102 for interacting with the web service and/or the remote device 104, a web service or the like executing on the data storage device 108 for interacting with the remote server 104, a web service or the like executing on the remote server 104 for interacting with the weather service component 110, and/or other suitable software-based interfaces.

FIG. 2 illustrates a simplified block diagram of an exemplary computing device 200, in accordance with embodiments. One or more computing devices like computing device 200 may be included in the system 100 to implement the client device 102, the remote server 104, and/or other component(s) of the system 100. The computing device 200 can be configured to perform a variety of functions or acts, such as those described in this disclosure (and shown in the accompanying drawings), including generating, displaying, or otherwise providing the weather forecast user interface to the user, using the techniques provided herein.

The computing device 200 can include various components, including for example, one or more processors 202, memory 204, display screen 206, communications unit 208, and input/output (I/O) unit 210, all communicatively coupled by an I/O interface 212, which may include a system bus, network, or other connection mechanism. It should be understood that examples disclosed herein may refer to computing devices and/or systems having components that may or may not be physically located in proximity to each other. Certain embodiments may take the form of cloud based systems or devices, and the term "computing device" should be understood to include distributed systems and devices (such as those based on the cloud), as well as software, firmware, and other components configured to carry out one or more of the functions described herein. Further, one or more features of the computing device 200 may be physically remote and may be communicatively coupled to the computing device 200, via the communications unit 208, for example.

Processor 202 can be configured to execute software instructions stored in memory 204 and control operation of the computing device 200. Processor 202 may include a general purpose processor (e.g., data processor) and/or a special purpose processor (e.g., graphics processor or digital signal processor (DSP)). Processor 202 may be any suitable processing device or set of processing devices for processing, inputting, outputting, manipulating, storing, or retrieving data, such as, but not limited to, a central processing unit, a microprocessor, a microcontroller-based platform, an integrated circuit, one or more field programmable gate arrays (FPGAs), and/or one or more application-specific integrated circuits (ASICs).

Memory 204 may be any type of hardware that is capable of storing information on a temporary or permanent basis. Memory 204 may include one or more of a data storage device, an electronic memory, a nonvolatile random access memory (e.g., RAM), flip-flops, a non-transitory computer-writable or computer-readable storage medium or media, a magnetic or optical data storage device, or other electronic device for storing, retrieving, reading, or writing data. In some cases, memory 204 includes multiple kinds of memory, particularly volatile memory and non-volatile memory.

Memory 204 can store one or more computer program modules, computer executable instructions, or other software, such as, e.g., one or more software applications 214 shown in FIG. 2, for execution by processor 202. In embodiments, memory 204 is configured to store one or more sets of instructions or software that, when executed by processor 202, cause the processor 202 to implement one or more techniques of the present disclosure. For example, the instructions may embody one or more of the methods or other operations described herein for providing the weather forecast user interface (such as, e.g., method 900 shown in FIG. 9). In some cases, the instructions may reside completely, or at least partially, within any one or more of memory 204, separate computer readable medium, and/or within the processor 202 during execution of the instructions.

Figure 9:
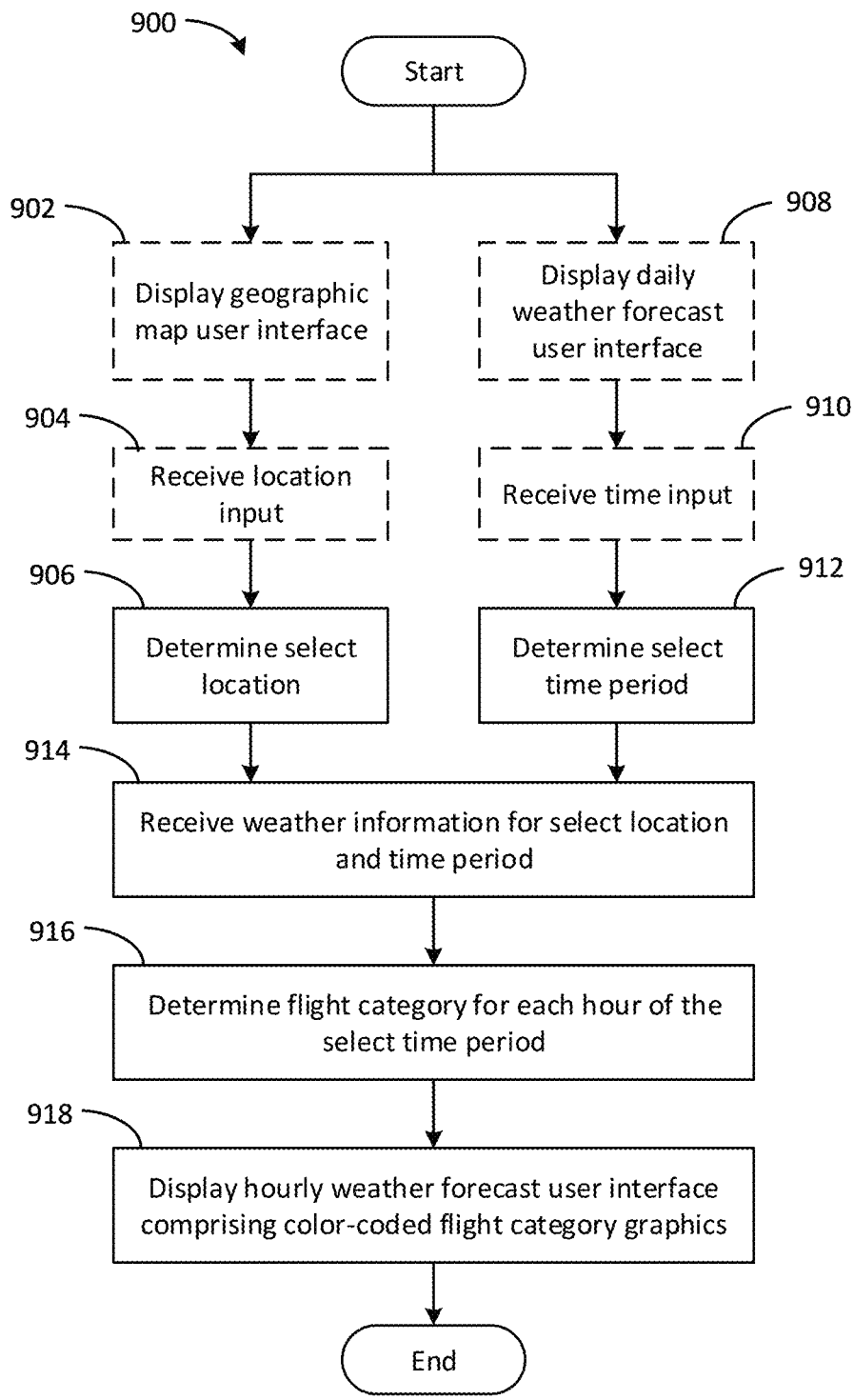
FIG. 9 is a flow diagram of an exemplary method for assessing and presenting aviation-focused weather information, in accordance with embodiments.

In embodiments, the one or more software applications 214 may include an aviation-focused weather forecasting application configured to implement the methods or operations described herein, such as, for example, as described with respect to system 300 of FIG. 3 and/or method 900 of FIG. 9. In some embodiments, the aviation-focused weather forecasting application may reside on multiple devices, such as, e.g., the client device 102 and/or the remote server 104 of FIG. 1. The one or more software applications 214 may also include one or more software interfaces or computer programs tailored to interact and exchange data with one or more components of the system 100, or with the aviation-focused weather forecasting application, such as, e.g., a mobile application that can be executed on a smart phone, tablet, or other mobile device, or a web application that can be executed on a desktop computer or laptop.

Communications unit 208 allows the computing device 200 to communicate with one or more devices (or systems) according to one or more protocols. For example, communications unit 208 may comprise one or more radio transceivers configured for communicating with a cellular network, a wireless local area network, a wide area network, a Bluetooth® network, and/or other personal area networks (e.g., RFID, NFC, etc.). Though not shown, communications unit 208 may further include antennas, modems, and other wireless communication circuitry for carrying out wireless communications.

Display unit 206 can be configured to display a visual output on the computing device 200. The visual output may include, for example, the weather forecast user interface described herein, other graphical user interfaces described herein, and/or other information (e.g., text, icons, objects, video, or any combination thereof). Display unit 206 may include LCD (liquid crystal display) technology, LPD (light emitting polymer display) technology, LED (light emitting diode) technology, or other display technologies. Display unit 206 may be integrated into the computing device 200 or functionally coupled to the device 200 using a wired or wireless connection, as will be appreciated. I/O unit 210 can be configured to facilitate interaction between a user and the computing device 200, as well as allow for input and output of data with other devices connected to the computing device 200. I/O unit 210 may include input components, such as, for example, a keyboard, a keypad, a mouse, a microphone, and a video capture device or camera, and output components, such as, for example, a haptic feedback system and an audio output system or speaker. Some components of the I/O unit 210 may be internal to, or included in, the computing device 200, while others may be externally located and connected to the computing device 200 using a wireless connection or a wired connection (e.g., Universal Serial Bus ("USB") cable or the like). In some cases, the I/O unit 210 further include a data port (such as, e.g., a USB port, a mini-USB port, a Lightening connector port, etc.) for receiving data from and/or transmitting data to an external data source or other device coupled to the data port.

In some embodiments, the I/O unit 210 further includes a touch sensitive surface disposed over, or on top of, at least a portion of the display screen 206 to collectively form a touchscreen, or touch-sensitive display system. In such cases, the display screen 206 may operate as an output interface between the user and the computing device 200, while the touch-sensitive surface may operate as an input interface between the user and the computing device 200. For example, the touchscreen can be configured to detect contact or touch input on the touch-sensitive surface, or a movement or breaking thereof, and convert the detected contact into a visually-presented interaction with user-interactive graphics displayed on the display screen 206, for example, as part of the weather forecast user interface.

FIG. 3 illustrates an exemplary aviation-focused weather forecasting system 300 configured to assess aviation-focused weather information and graphically present the aviation-focused weather information on a display unit of an electronic device, in accordance with embodiments. In embodiments, the system 300 can be configured to generate, retrieve, display, or otherwise provide a graphical user interface ("GUI") for presenting said aviation-focused weather information to the user. The system 300 may be implemented using a computing device, such as computing device 200 of FIG. 2, and/or a networked system of computing devices, such as system 100 of FIG. 1. In addition, various components of the aviation-focused weather forecasting system 300 may be implemented using software executable by a processor (e.g., processor 202) of one or more servers or computers and stored in a memory (e.g., memory 204) thereof, such as the aviation-focused weather forecasting application. The system 300 may also be implemented through interactions between various components of the system 100 that are facilitated by software executing on multiple processors of said components, such as, e.g., one or more web services, a mobile application, a web application, etc.

Referring back to FIG. 3, the system 300 comprises an input module 302 configured to receive inputs or information indicating a desired or select time and location, an information module 304 configured to obtain aviation-focused weather information for the select time and location, and a graphics engine 306 configured to provide a user interface (e.g., GUI) capable of graphically presenting the aviation-focused weather information for the select time and location in an intuitive and interactive format, in accordance with embodiments. The modules 302 and 304 and the engine 306 may be implemented in hardware, software, or a combination of both. In various embodiments, each of the components 302, 304, and 306, in whole or in part, may be implemented as computer software (e.g., software modules, engines, and/or other components) stored in memory and operating on one or more processors associated with the system 100. In some embodiments, input module 302 and/or graphics engine 306 may be configured, using computer software instructions stored in a memory and executing on a processor of the client device 102, to carry out certain portions of the methods and operations described herein. Similarly, information module 304 may be configured, using computer software instructions stored in a memory and executing on a processor of the remote server 104, to carry out certain other portions of the method and operations described herein. In other embodiments, the graphics engine 306 and/or information module 304 may be carried out, in relevant part, by each of the client device 102 and the remote server 104. Other combinations or configurations for the depicted components of the system 300 are also contemplated and considered part of the present disclosure.

Figure 4A:
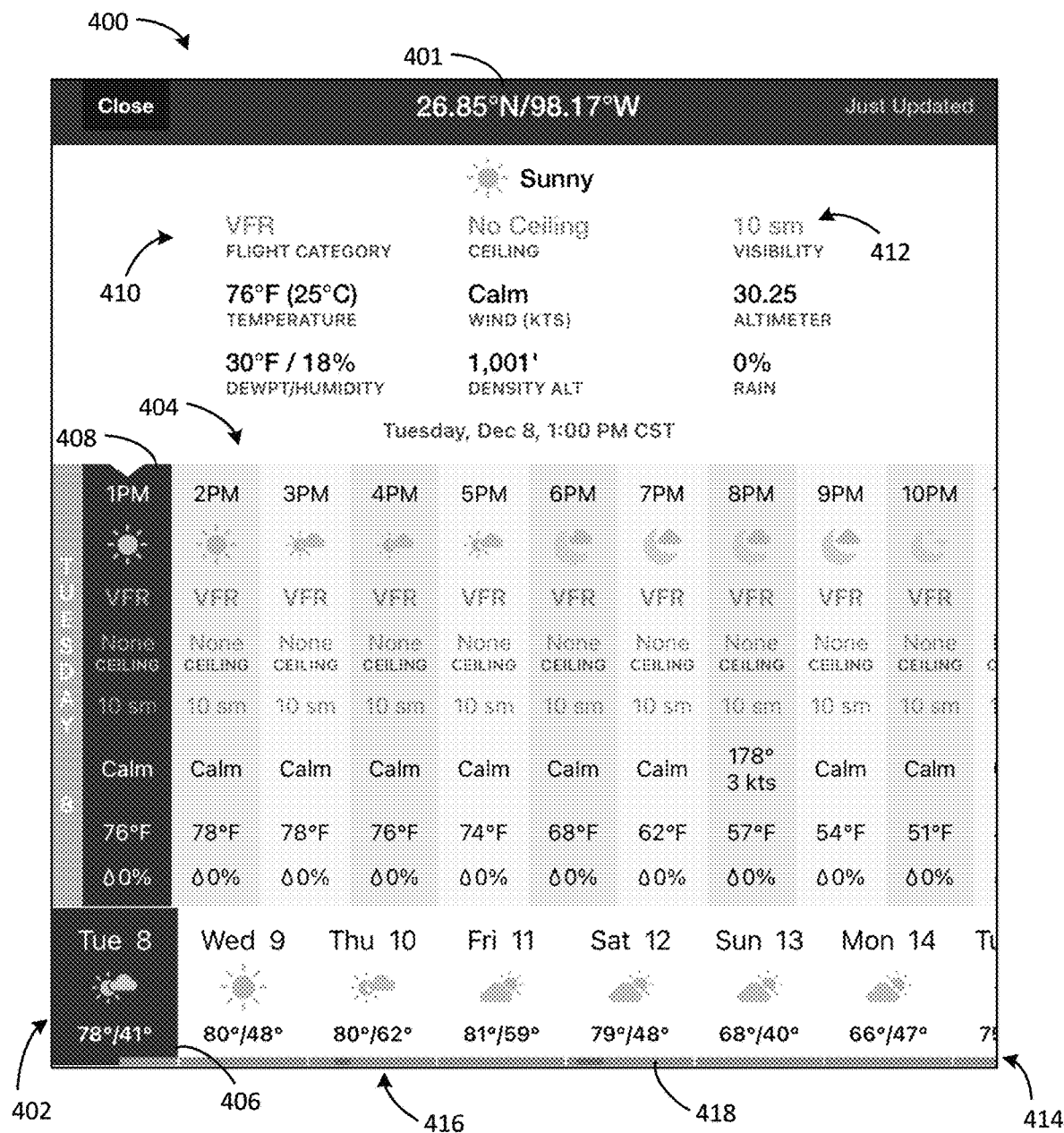
Figure 5A:
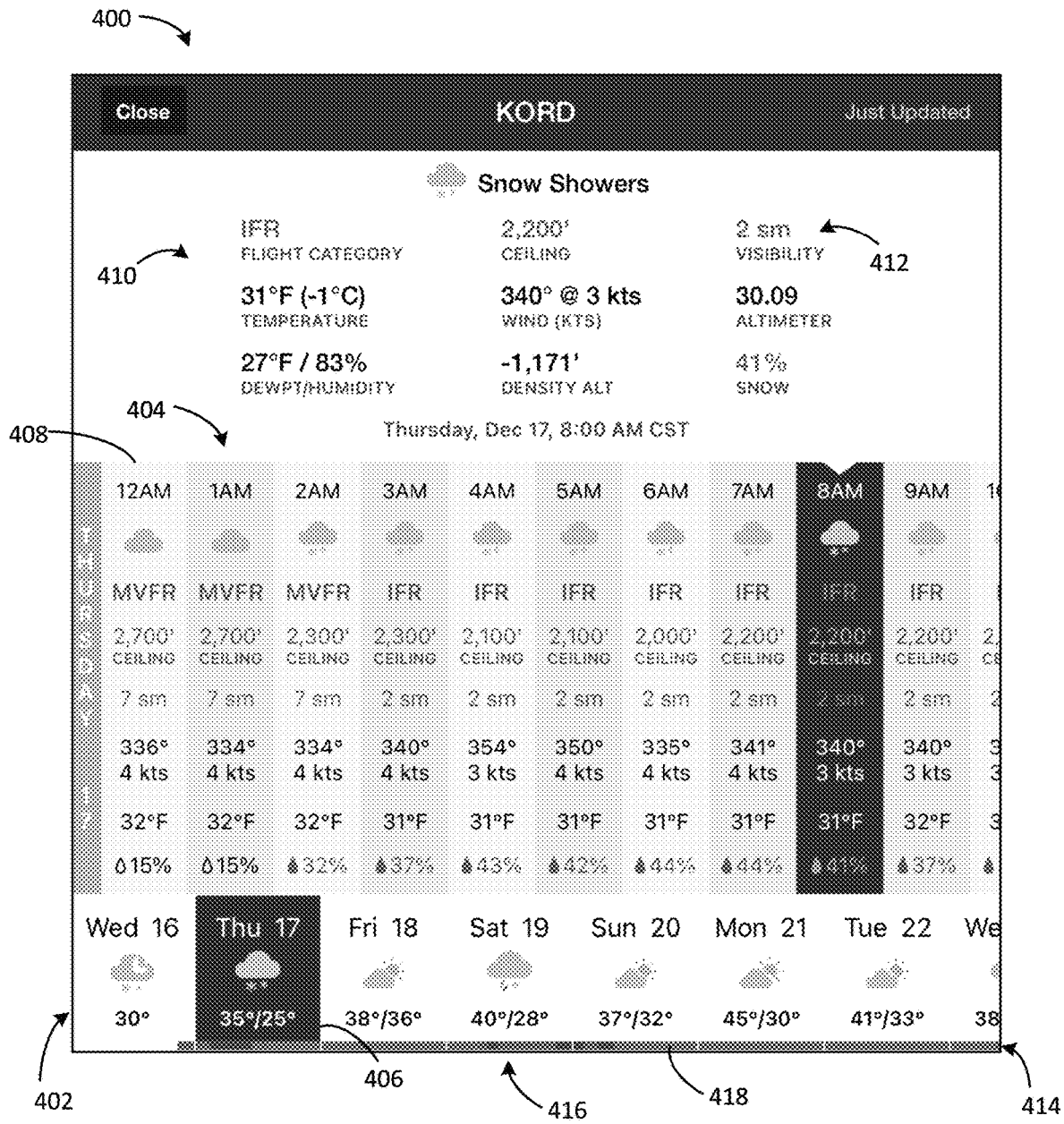
FIGS. 5A and 5B illustrate various images of the graphical user interface of FIG. 4A while viewing different hours of the same day, in accordance with embodiments.
Figure 5B:
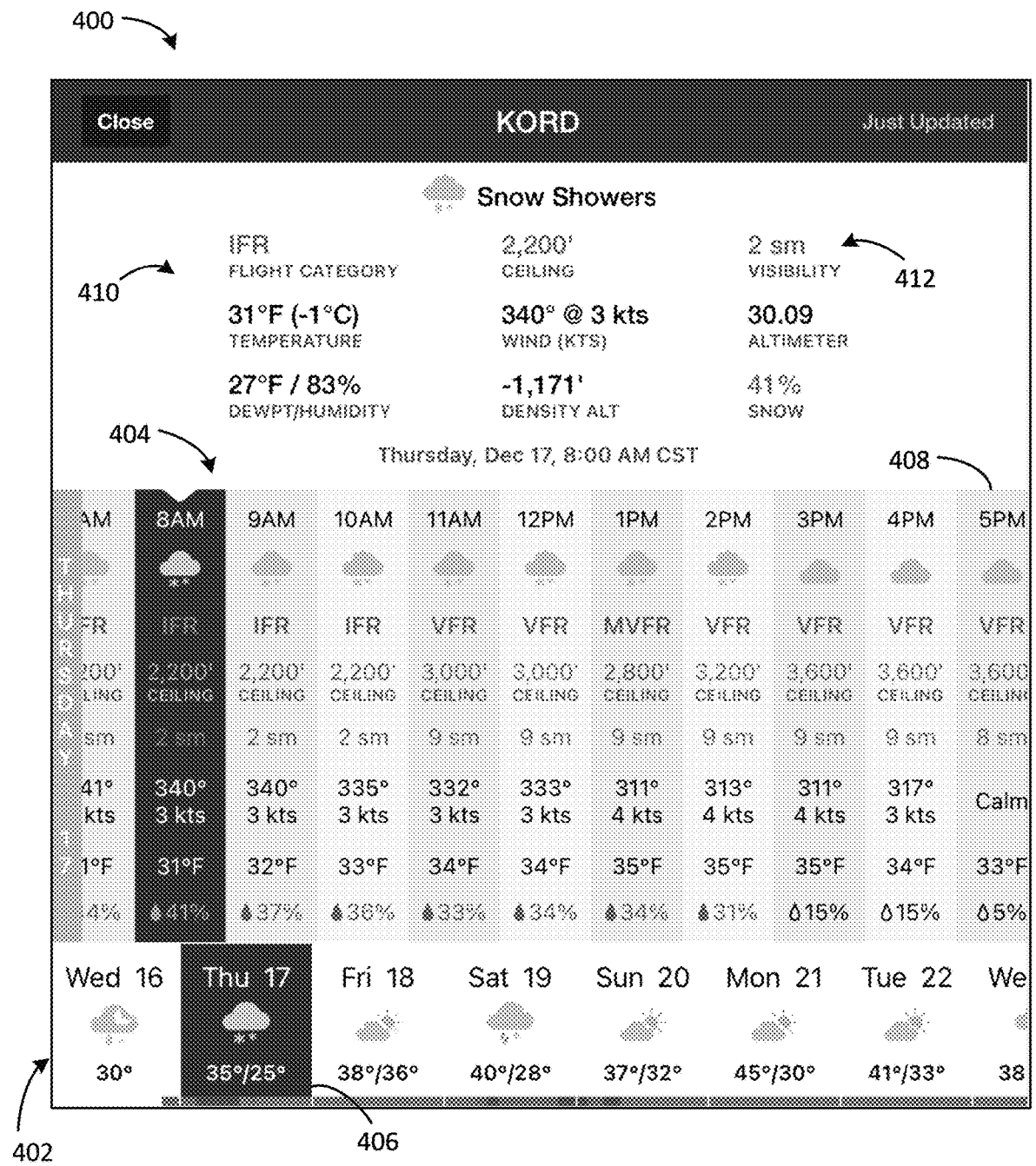
Figure 6A:
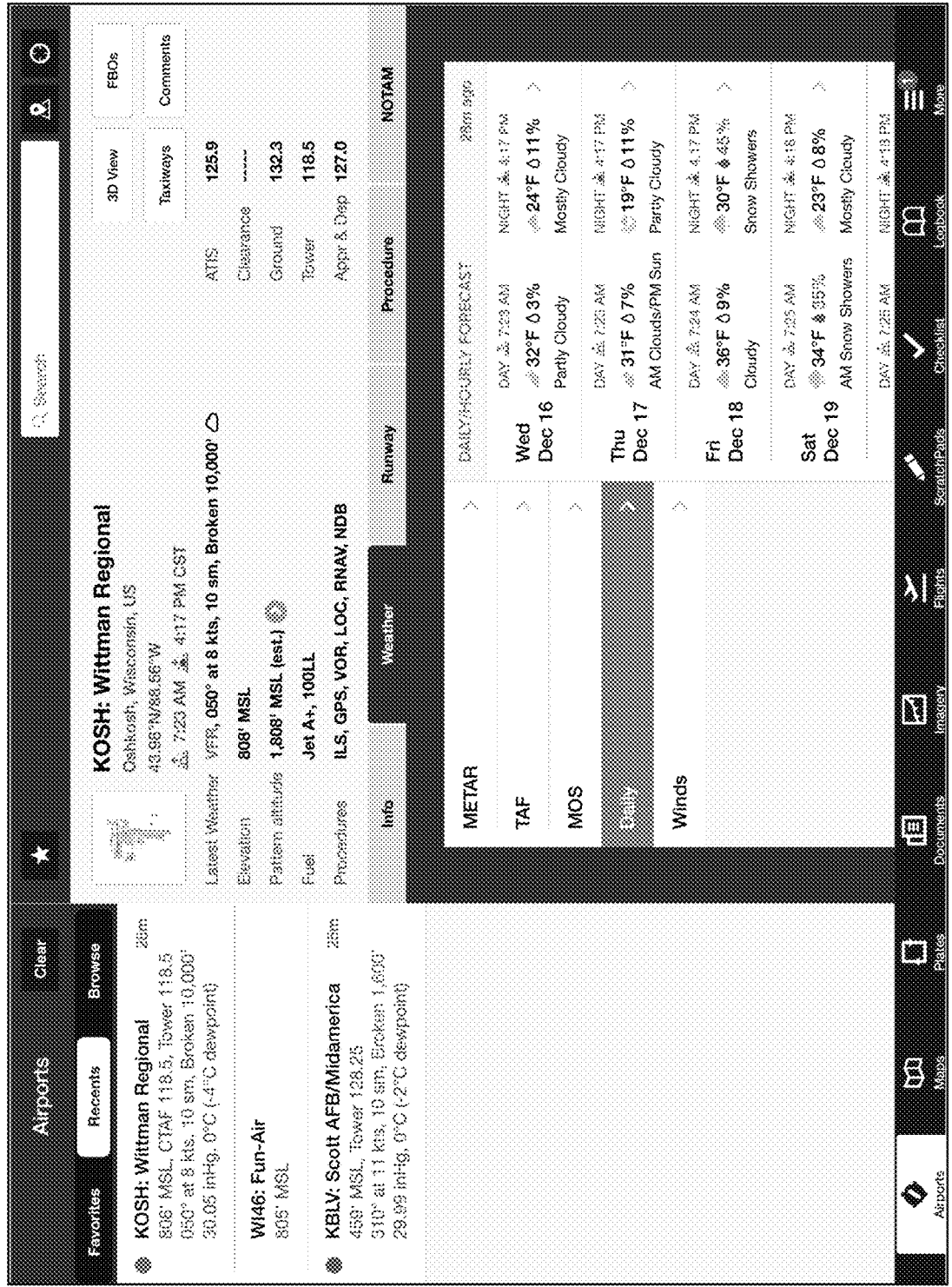
FIGS. 6A and 6B are screenshots of an exemplary graphical user interface (GUI) for presenting aviation-focused weather information in a daily summary format, rendered on different electronic devices, in accordance with embodiments.
Figure 6B:
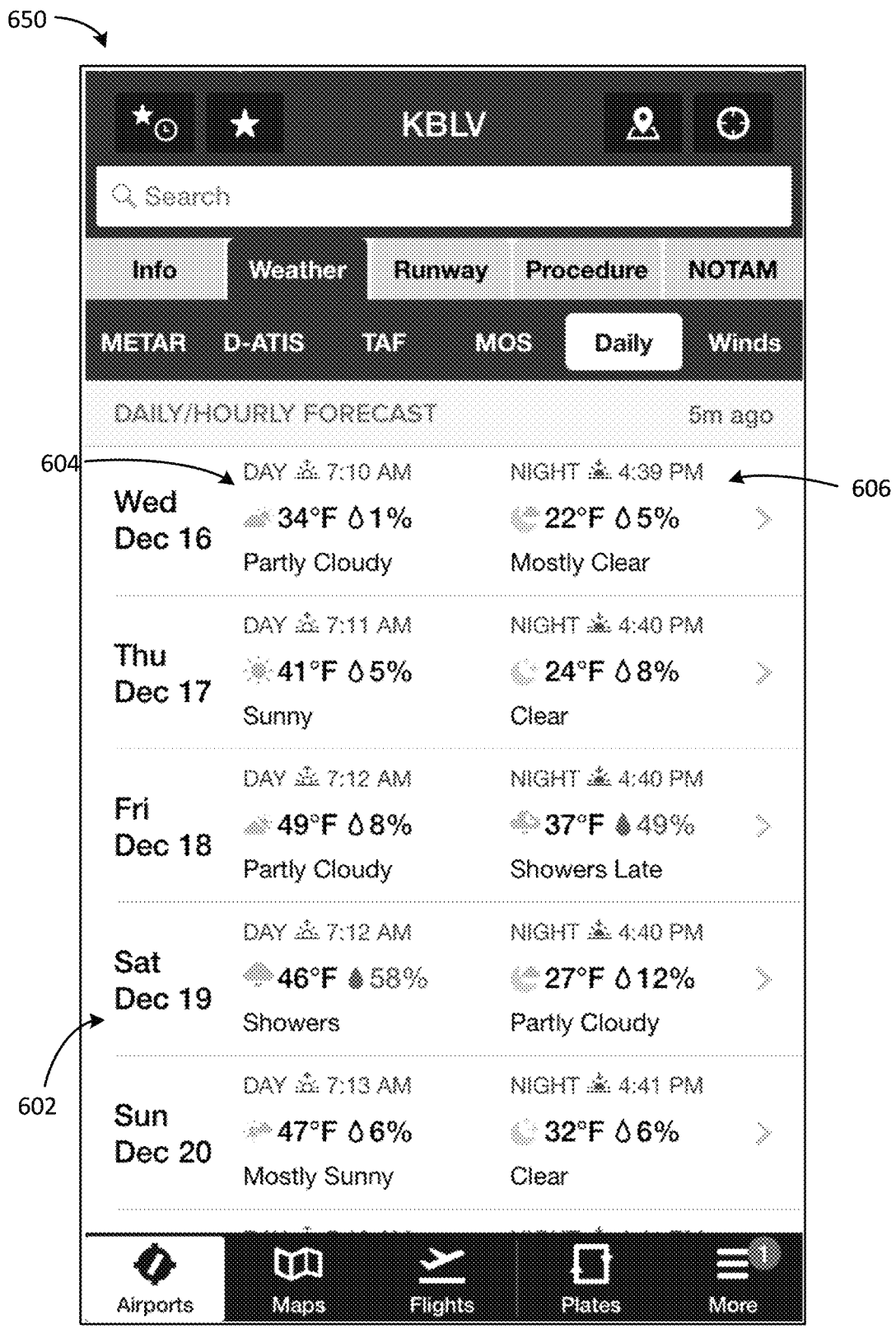

In embodiments, the input module 302 can be configured to receive one or more inputs, such as a time input 308 and a location input 310, and provide the received input(s) and/or information associated therewith to the information module 304 to request weather information corresponding to the location and/or time period indicated by the input(s). The inputs 308 and 310 may be received via one or more user interfaces provided by the system 100 and/or the system 300. In some embodiments, the inputs 308 and/or 310 may be associated with, or the result of, a user selection made using the weather forecast user interface. For example, the weather forecast user interface may include a plurality of user-selectable segments corresponding to various dates and/or hours and may be configured to enable a user to view weather information for a particular hour or calendar day by selecting the corresponding segment (e.g., as shown in FIGS. 4A through 5B). In some embodiments, the inputs 308 and/or 310 may be associated with, or the result of, a user selection made using a daily weather forecast user interface that includes user-selectable daily weather entries for a select location and a plurality of calendar days (e.g., as shown in FIGS. 6A and 6B).

According to embodiments, the location input 310 includes or indicates a select geographic location that is used by the information module 304 to define the geo-spatial boundaries of the weather information being retrieved for presentation on the weather forecast user interface. As an example, the location input 310 may include location information or other geographical indication, such as, but not limited to, a set of geographic coordinates (e.g., longitude and latitude), identification of a waypoint, airport (or an airport code associated therewith), city, or other landmark, or specific address information.

Also in embodiments, the time input 308 includes or indicates a select time, or point-in-time, that is used by the information module 304 to define the temporal boundaries of the weather information being retrieved for presentation on the weather forecast user interface. The time input 308 may include a day component 312 and an hour component 314, as shown in FIG. 3. The day component 312 may include date information or other indication of the calendar day or date associated with the select point-in-time. For example, the date information may include a day of the week (e.g., Monday, Tuesday, etc.), a month (e.g., January, February, etc.), a numerical day of the month (e.g., 1, 2, 3, etc.), a numerical year (e.g., 2021, 2022, etc.), and/or other relevant calendar information. As used herein, the term "calendar day" or "day" is defined as midnight or 12:00 AM to 11:59 PM within a time zone selected for the system 300 and/or the user interface. The hour component 314 may include hour information or other indication of the hour associated with the select point-in-time. For example, the hour information may include a numerical timestamp (e.g., 02:03:35, 04:30, 13:00, etc.), a time of day abbreviation (e.g., AM or PM), and/or a time zone indication (e.g., PST, CST, EST, etc.).

The time input 308 may refer to a current point-in-time or a future point-in-time. In either case, the time input 308 can be used, for example, by the information module 304 and/or the graphics engine 306, to determine a time period of the weather information displayed in the weather forecast user interface. In various embodiments, the time period displayed on the weather forecast user interface may include the point-in-time provided by the time input 308, a first calendar day that contains the point-in-time, a first hour that contains the point-in-time, a predetermined number of calendar days starting from the first calendar day, and a predetermined number of hours started from the first hour.

In some cases, the exact number of days and hours displayed may vary depending on the electronic device used to access the weather forecast user interface, or more specifically, a physical size of the display screen of said device. For example, FIG. 4A illustrates a GUI 400 configured to present general weather information for at least seven calendar days (e.g., Dec. 8-14, 2020) and aviation-focused weather information for at least 10 hours (e.g., 1 PM to 10 PM) of a selected one of those seven days (e.g., Dec. 8, 2020). Conversely, FIG. 4B illustrates a GUI 450 that is thinner in width than GUI 400 and thus, configured present weather information for a shorter time period. In particular, GUI 450 is configured to present general weather information for at least 4 calendar days (e.g., Dec. 16-19, 2020) and aviation-focused weather information for at least 6 hours (e.g., 1 PM to 6 PM) of a selected one of those days. As will be appreciated, the exact number of days and hours on display within the weather forecast user interface can also depend on the graphical arrangement of information in the user interface and other considerations, such as, for example, text size, graphics size, amount of information, etc.

According to embodiments, the displayed time period may change or adapt as new time inputs 308 are received at the input module 302 via the weather forecast user interface or other user interface. In such cases, the weather forecast user interface may comprise one or more user-selectable or interactive segments for enabling the user to enter time inputs 308 for changing the time period on display in the user interface (e.g., as shown in FIGS. 5A to 5B). In response to receiving a new time input 308, the system 300 may be configured to display new set of weather information corresponding to the new time input 30 on the weather forecast user interface.

In some embodiments, the time input 308 may be received from one or more other user interfaces associated with system 300. For example, the flighting planning software application and/or the system 300 may be configured to display a second user interface for displaying summarized general weather information for a plurality of calendar days or dates and enable user selection of any date presented in the second user interface (e.g., as shown in FIGS. 6A and 6B). In response to receiving a time input 308 indicating a selected date via the second user interface, the system 300 may be configured to present the weather forecast user interface on the electronic device with aviation-focused weather information for the selected date.

Figure 7A:
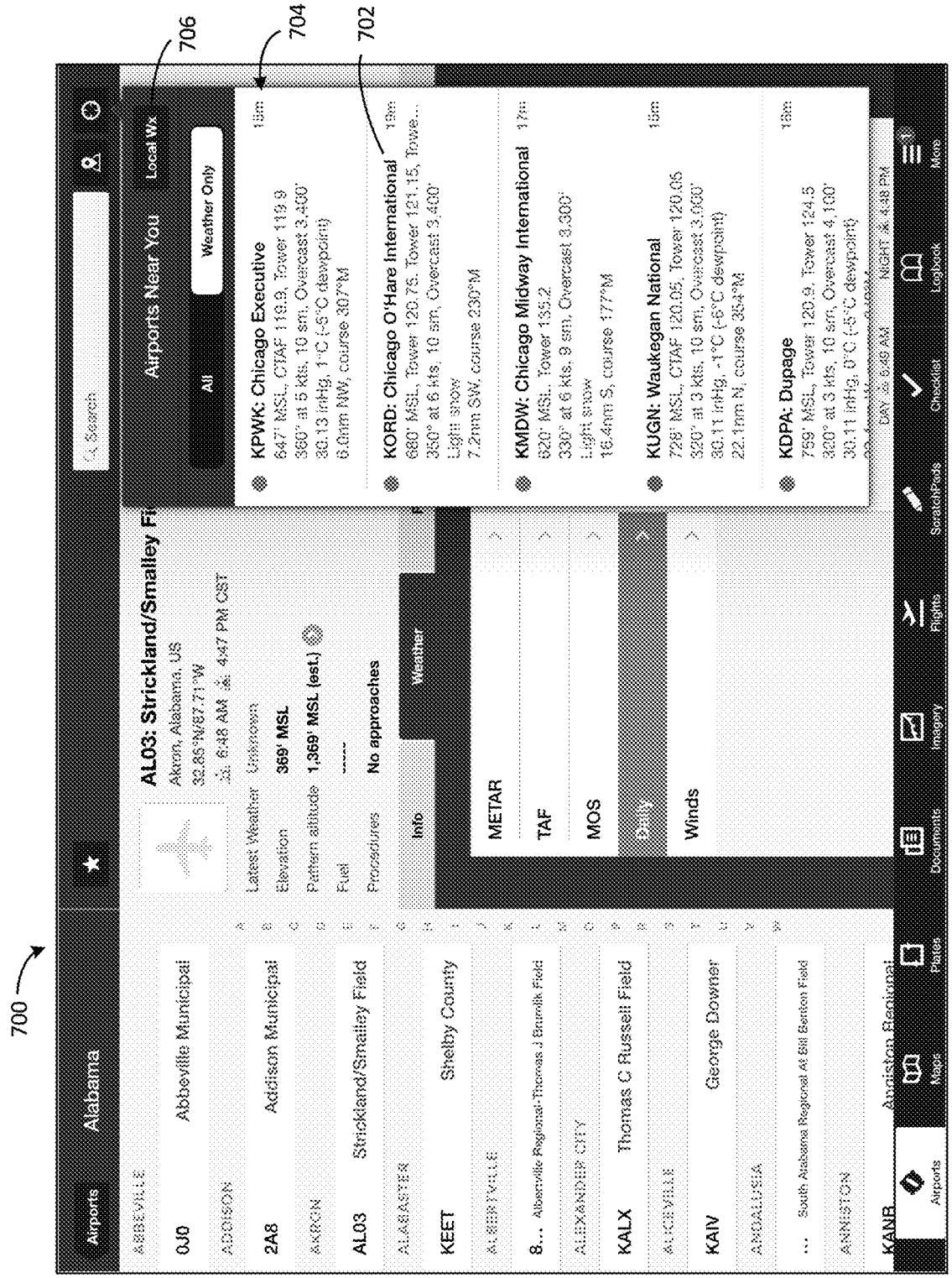
FIGS. 7A through 8B are screenshots of various exemplary graphical user interfaces (GUIs) for selecting a geographic location, rendered on different electronic devices, in accordance with embodiments.
Figure 7B:
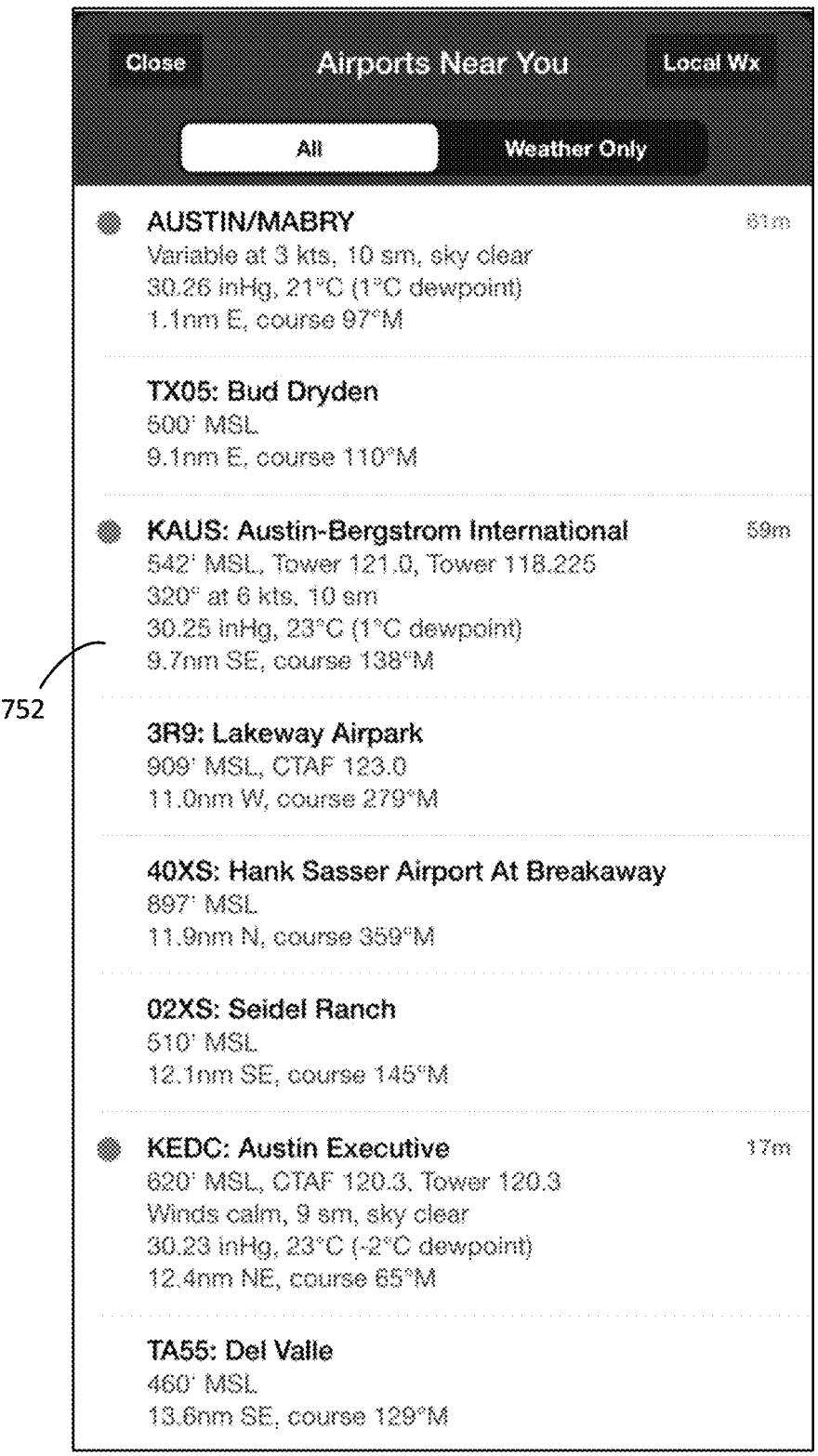
Figure 8A:
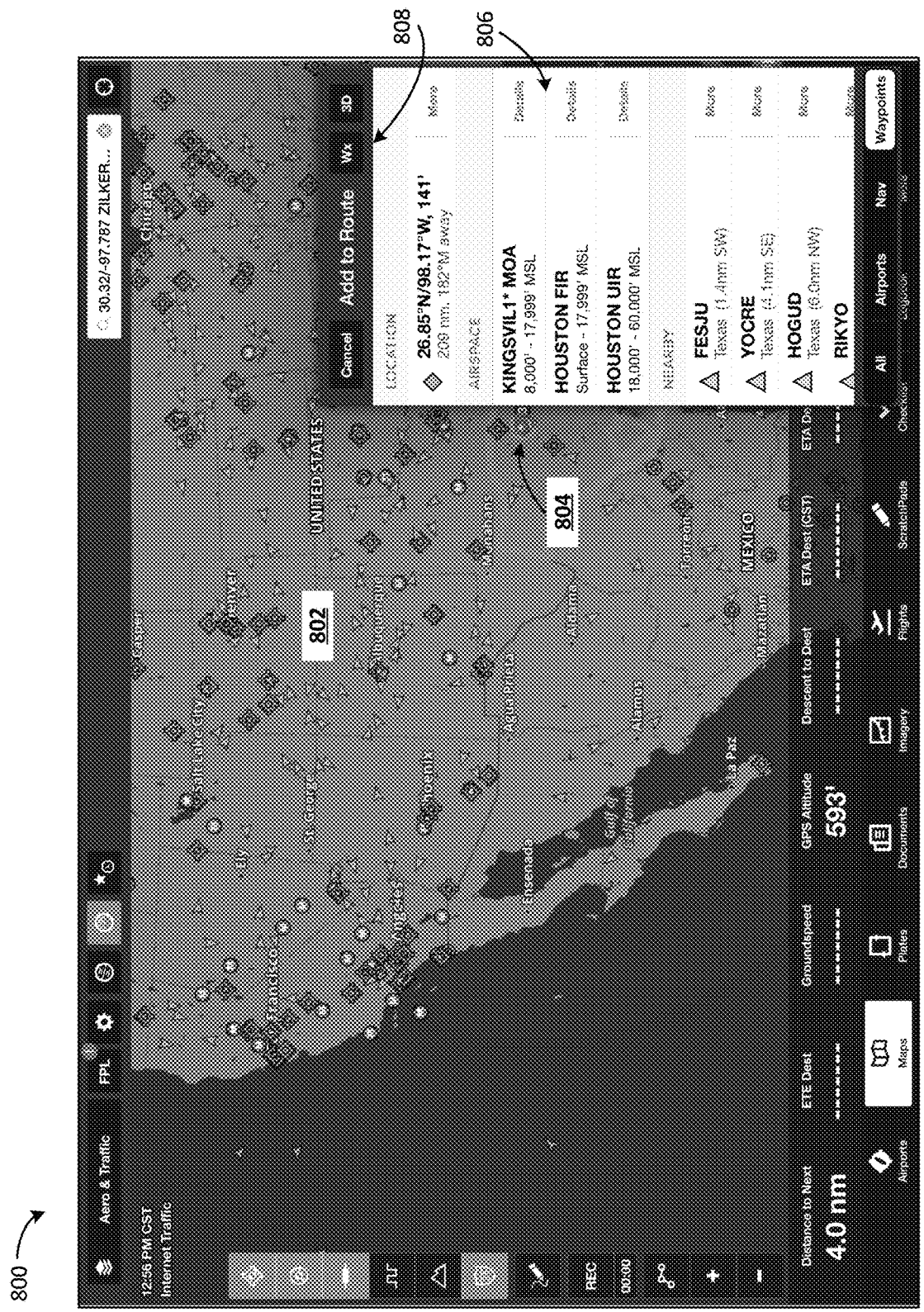
Figure 8B:
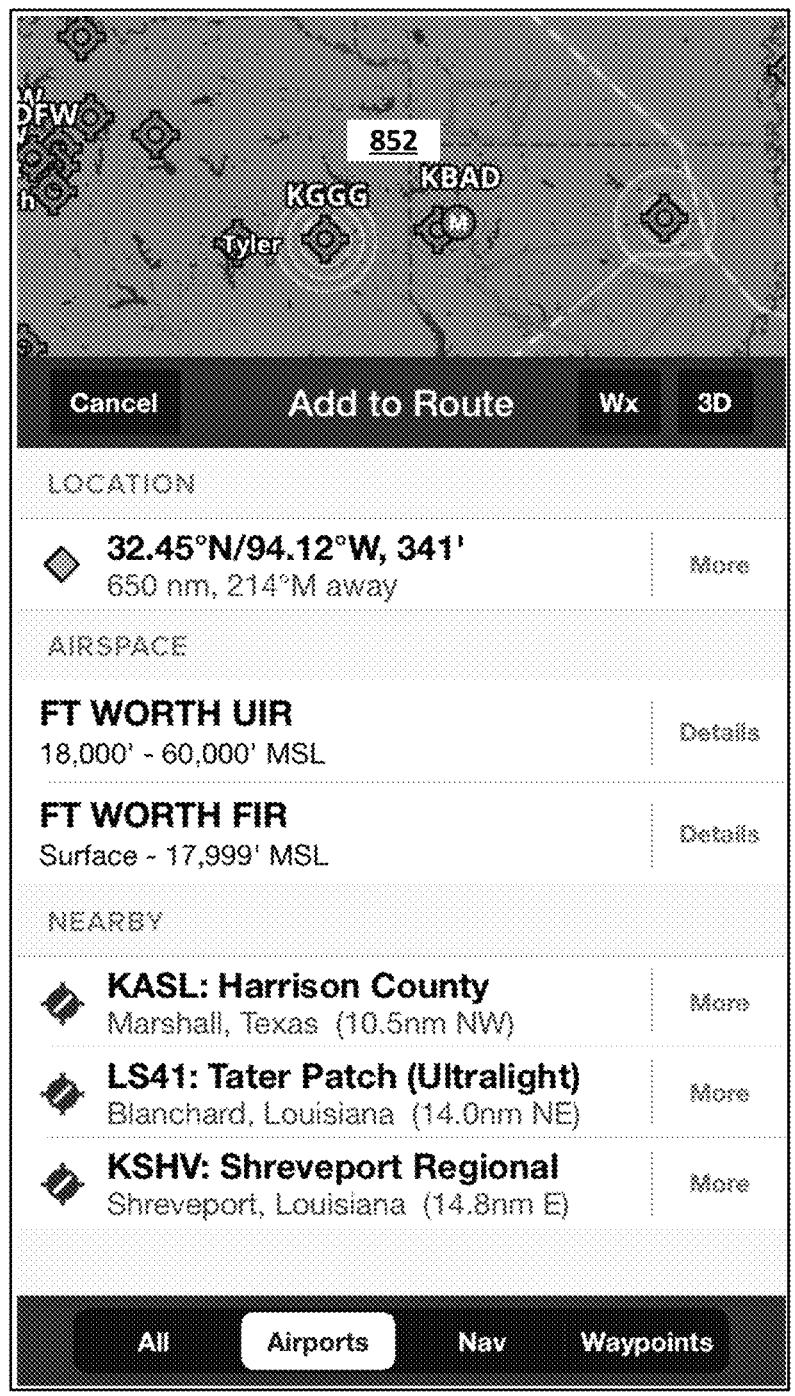

In embodiments, the location input 310 may be received from one or more user interfaces associated with, or presented by, the flight planning software application, or other user interface associated with system 300 (e.g., as shown in FIGS. 7A through 8B). For example, the flight planning software application may include a user interface configured to display a geographical map and enable user selection of any location on the map (e.g., as shown in FIGS. 8A and 8B). In such cases, the location input 310 may include the coordinates of a location selected on the map, or other geographic information for the map location. As another example, the flight planning software application may include a user interface configured to display a list of geographic locations by name, such as, for example, airports, waypoints, cities, or other landmarks, and enable user selection of any location named in the list (e.g., as shown in FIGS. 7A and 7B). In such cases, the location input 310 may include the name or other identification of a location selected from the list. In either case, in response to receiving a location input 310 indicating a location selected via the flight planning software application, the system 300 can be configured to present the weather forecast user interface on the electronic device with aviation-focused weather information for the selected location.

In other embodiments, the inputs 308 and/or 310 may be automatically received or determined in response to, or as a result of, one or more settings of the weather forecast user interface and/or the flight planning application. For example, in certain instances, detected or known information retrieved from the electronic device (such as, e.g., a current point-in-time, a currently detected location, etc.) may be used to automatically determine the select time and/or the select location. In such cases, the time input 308 may indicate the current point-in-time, and the location input 310 may indicate a currently detected location of the electronic device, a last known location of the electronic device, or a previously-selected "home" location stored in a user profile or otherwise associated with the flight planning software application and/or the weather forecast user interface.

Referring back to FIG. 3, the information module 304 comprises a plurality of components (e.g., software modules, databases, tables, or the like) for obtaining or retrieving weather, or weather-related, information corresponding to the time and location information included in the inputs 308 and/or 310 received from the input module 302, and providing the retrieved information to the graphics engine 306 for use in generating the weather forecast user interface. For example, as shown in FIG. 3, the components of the information module 304 can include, but are not limited to, an aviation-specific weather conditions block 316, a general weather conditions block 318, and a sunset and sunrise times block 320.

The information module 304 can be configured to obtain corresponding information for each of blocks 316, 318, and 320 from a memory (or database), such as, but not limited to, a local cache or other memory of the electronic device (e.g., memory 204), a remote storage device in communication with the electronic device.(e.g., remote server 104, data storage device 108, and/or weather service 110), or any other data storage location associated with the system 100. In some embodiments, the weather-related information may be pre-loaded into the memory and retrieved by the information module 304 as needed. For example, weather forecasts for a number of geographical locations (e.g., a local area, most frequented locations, etc.) and/or a predetermined period of time (e.g., 10 to 12 days in advance) may be stored in a database and continuously updated as new information becomes available. In some embodiments, the information module 304 may be configured to store received weather information in a local cache or other memory of the electronic device for up to about 60 minutes when "online" (e.g., connected to network 106 of FIG. 1), and up to about 24 hours when "offline" (e.g., disconnected from network 106). When the weather information displayed in the weather forecast user interface is older (e.g., older than about 2 hours), the displayed information may be highlighted or otherwise configured to indicate its age (e.g., using red text). In other embodiments, the information may be requested directly from one or more weather information sources by the information module 304 in response to receiving time and location time inputs 308 and 310 from the input module 302 and temporarily stored in the memory to enable the operations of the system 300.

The sunset and sunrise times block 320 can be configured to obtain an expected sunrise time and an expected sunset time for each calendar day included in the time period indicated by the time input 308 and provide the received information to the graphics engine 306.

The general weather conditions block 318 can be configured to obtain general or surface weather information, or weather information that is commonly used to generate everyday forecasts for on the ground or terrestrial situations, and based thereon, provide, to the graphics engine 306, observed and/or forecast general weather conditions for the select time and location. The general weather conditions output by the block 318 can include, but are not limited to, dew point and/or humidity information 332 (e.g., dew point temperature in Celsius and/or Fahrenheit, relative humidity percentage, and like), wind information 334 (e.g., wind speed in knots, wind direction in number of degrees, and the like), temperature information 336 (e.g., current temperature in Celsius and/or Fahrenheit, high and low temperature predictions for the day, and the like), and precipitation information 338 (e.g., chance of precipitation, expected type of precipitation (e.g., rain, snow, sleet, hail, etc.), expected accumulation in number of inches and/or centimeters (if any), and the like). In addition, or in the alternative, other types of general weather information may be obtained by the block 318 and provided to the graphics engine 306, depending on the weather information presented on the weather forecast user interface.

The aviation-specific weather conditions block 316 can be configured to obtain aviation-specific weather information, or weather and weather-related information that is particularly pertinent to planning flight operations and other airborne situations, and based thereon, provide, to the graphics engine 306, current (or observed) and/or forecast aviation-specific weather conditions for the select time and location indicated by the inputs 308 and 310. The aviation-specific weather conditions output by the block 316 can include, but are not limited to, altimeter data 322 (e.g., atmospheric pressure measurements in inches of mercury (inHg) and/or hectopascals (hPa), and the like), density altitude data 324 (e.g., altitude measurements in feet and/or meters, and the like), ceiling data 326 (e.g., cloud height measurements in feet and/or meters, and the like), ground visibility data 328 (e.g., distance measurements in statute miles (sm) and/or meters, and the like), and flight category 330 (e.g., applicable flight conditions, rules, or other regulatory requirements, and the like).

In some cases, the weather conditions output from block 316 to the graphics engine 306 may include the corresponding weather information as is, or in the same form it was received (e.g., as raw data). In other cases, the block 316 may be configured to assess or otherwise process the received weather information, reformat the information (e.g., extract only desired data elements, combine two or more data elements, etc.), and/or derive one or more of the aviation-specific weather conditions 322, 324, 326, 328, and 330 based on pertinent information included therein. For example, the block 316 can be configured to determine the corresponding flight category 330 for a given time and location based on the ceiling data 326 and the visibility data 328 received for the same time and location.

In embodiments, the flight category determination may include assessing the ceiling data 326 and the visibility data 328 to identify a flight condition, rule, or other regulation associated with each and comparing the identified flight conditions to determine the "worst" of the two, or the poorest weather conditions for flying. The aviation-specific weather conditions block 316 then uses or assigns the worst flight condition as the flight category 330 for the given time and location. In various embodiments, the block 316 can be configured to carry out the flight rule comparison using any suitable technique, including, but not limited to, ordering or ranking the flight rules from poorest weather conditions to clearest or best conditions, assigning a numerical value or rank to each flight rule (e.g., 1 to 4, with 1 being the poorest), and comparing the corresponding numerical values to determine whether the ceiling or the visibility data that is associated with the poorest weather (e.g., the lowest ranking or number).

In the above cases, the flight conditions, rules, or other regulatory requirements associated with the ceiling data 326 and visibility data 328 can be based on the cloud height and ground visibility measurements received at the information module 304, respectively. For example, the block 316 may be configured to use table 10 of FIG. 10 to identify the appropriate flight condition or rule for the ceiling data 326 and the visibility data 328 upon receipt. As shown, table 10 lists a plurality of flight conditions (e.g., flight rules established by the FAA) including: Low Instrument Flight Rules ("LIFR"), Instrument Flight Rules ("IFR"), Marginal Visual Flight Rules ('MVFR"), and Visual Flight Rules ("VFR). The table 10 also lists the ceiling criteria and visibility criteria (e.g., select numerical ranges and/or thresholds) associated with each flight condition. Moreover, the table 10 lists the flight conditions in descending order of severity (i.e. a flight condition of VFR indicates better weather conditions than a flight condition of IFR).

In an exemplary use case, the block 316 may utilize table 10 to determine that the applicable flight rule for a ceiling height of 2,800 feet is "MVFR" (since its between 1,000 and 3,000 feet,) while the applicable flight rule for a visibility reading of 10 sm for the same time and location is "VFR" (because it's greater than 5 miles). Upon comparing the applicable flight rules, the block 316 may determine that the appropriate flight category for the same time and location is "MVFR," since MVFR is a "worse" condition, or is associated with poorer weather conditions, than VFR (e.g., as shown in FIG. 4B).

Though not shown, the VFR flight rules may apply only when both the ceiling criteria of greater than 3,000 feet and the visibility criteria of greater than 5 miles are met. The rest of the flight rules (i.e. LIFR, IFR, and MVFR) may apply when at least one of the corresponding ceiling criteria and the corresponding visibility criteria are met. It should be appreciated that other rules or regulations pertaining to flight operations, whether established by the FAA or used other relevant organizations (e.g., National Weather Service ("NWS")), can be used, in addition to or instead of, the flight rules displayed in FIG. 10.

Referring back to FIG. 3, the graphics engine 306 can be configured to assess or otherwise process the information received from the information module 304 and the input module 302, determine or generate appropriate graphical elements, icons, or other graphics for representing one or more pieces of the received information in the weather forecast user interface, populate corresponding display regions, data fields, and other graphical areas of the weather forecast user interface with the graphics and received information, and otherwise provide the weather forecast user interface for display on the display unit of the electronic device, in accordance with embodiments. As shown, the graphics engine 306 may comprise a plurality of components (e.g., software modules, engines, databases, tables, or the like) to help with discrete aspects of these operations. For example, the components of the graphics engine 306 may include, but are not limited to, a units selection block 340, a text color selection block 342, a flight condition graphics block 344, a rain icon selection block 346, and a weather icon selection block 348. In embodiments, each of these components can be configured to receive certain pieces of information from the input module 302 and/or the information module 304 and make specific determinations or selections based thereon.

In particular, the units selection block 340 can be configured to select an appropriate units system or system of measurement (e.g., metric system, U.S. system, etc.) for the information presented by the weather forecast user interface based on a location or preference of the user, in accordance with embodiments. For example, if the location input 310 provides a location in Europe or other region that uses the metric system, the units selection block 340 may be configured to select the metric system as the units system for information displayed on the weather forecast user interface. Conversely, if the location input 310 provides a location in the United States of America, the units selection block 340 may be configured to select the U.S. units system.

In some cases, the block 340 may be configured to select the units system based on location information included in the location input 310 received from the input module 302. For example, the location input 310 may include indication of a current location of the electronic device (or user), the current location being detected based on Global Positioning System ("GPS") data or the like associated with the device. In other cases, the units selection block 340 may be configured to select a default units system based on a "home" location or other residence information included in a user profile or other account information of the user, regardless of the user's current location. In still other cases, the units selection block 340 may be configured to select a particular units system based on a user preference included in the user profile, entered via the flight planning software application, or otherwise received at block 340. In either case, the home location or user preference information may be provided as part of the location input 310 and/or may be previously received at block 340 and stored in a memory.

The rain icon selection block 346 can be configured to select an appropriate rain icon for a given hour or other point-in-time based on the corresponding precipitation information received from the information module 304 for that time. The graphics engine 306 can be configured to place the selected rain icon in one or more locations of the weather forecast user interface in association with, or in place of, the corresponding precipitation information. The precipitation information may include a predicted chance of rain, snow, or other precipitation, as described herein. In embodiments, the block 346 may be configured to select a first rain icon when the chance of precipitation is less than a predetermined threshold (e.g., 25 percent), and select a second rain icon when the chance of precipitation is equal to or greater than the threshold. In some embodiments, the first and second rain icons may be similar in size and shape, but the first rain icon may be black or gray in color, while the second rain icon may be blue in color (e.g., as shown in FIG. 5A). In other embodiments, the rain icon selection block 346 may be configured to use other colors, icons, or graphical representations to depict the various types of precipitation information.

The weather icon selection block 348 can be configured to select an appropriate weather icon for a given hour or other point-in-time based on the corresponding general weather information received from the information module 304 for that time. The graphics engine 306 can be configured to present the selected icon in one or more locations of the weather forecast user interface in association with, or in place of, the corresponding general weather information (e.g., as shown in FIGS. 5A and 5B). In embodiments, the block 348 may include or have access to a weather icon database or table stored in a memory associated with the system 300. The weather icon table may be configured to store a plurality of weather icons or other graphical elements for symbolizing or representing various general weather conditions. Each graphical icon may be stored in the table in association with a description or other identification of the corresponding weather condition or conditions.

According to embodiments, the block 348 may be configured to assess or otherwise process the received general weather information, determine or derive one or more general weather conditions from the received information, and retrieve the weather icon corresponding to the identified weather condition(s) from the table. The general weather conditions may include any type of general weather, including, but not limited to, sunny and clear, partly sunny, windy, cloudy, rain, snow, sleet, thunderstorms, hurricane, tornado, etc. In some embodiments, the general weather conditions may be determined based on the precipitation information 338 and/or the wind information 334 received from the information module 304. In some cases, two or weather conditions may be represented, in combination, by a single graphical icon. For example, sunny weather conditions may be represented by a first weather icon, while sunny and windy weather conditions may be represented by a second weather icon.

In some embodiments, one or more of the weather icons are configured to indicate a time of day (e.g., daytime or nighttime). In such cases, the weather icon selection block 348 can be configured to select the appropriate weather icon based further on the sunset and sunrise times received from the information module 304. For example, the weather icons may include a first set of icons for representing the occurrence of certain weather conditions during daylight hours and a second set of icons for representing the same weather conditions but during nighttime hours. These icons may be stored in the weather icon table with an indication of the time of day. The block 348 can be configured to process the sunrise and sunset times received from block 320 to identify the daytime hours and/or nighttime hours for the selected day and based thereon, determine whether a selected hour falls within the daytime or nighttime. The block 348 can be further configured to select an appropriate weather icon for an identified weather condition from the first set or the second set based on the identified time of day.

The text color selection block 342 can be configured to select an appropriate color for text displayed on the weather forecast user interface to present certain weather conditions (e.g., as illustrated in FIG. 5B). In some embodiments, the text color selection block 342 may receive select general weather conditions from one or more components of the block 318, such as, for example, precipitation information 338. In such cases, the text color selection block 342 can be configured to select an appropriate color for a textual representation of the precipitation condition, based on a predicted chance of precipitation associated with that condition. For example, block 342 may be configured to select a first color (e.g., blue) for the text if the chance of precipitation is equal to or higher than a threshold (e.g., 25 percent) and select a second color (e.g., black or gray) for the text if the chance of precipitation is less than the threshold. In various embodiments, the precipitation text may be displayed individually, or adjacent to the rain icon selected at block 346, in which case the colors of the text and icon may match (e.g., as shown in FIG. 5B).

As shown in FIG. 3, the text color selection block 342 may also receive select aviation-specific weather conditions from the components of block 316, such as, for example, ceiling data 326, visibility data 328, and flight category 330. In such cases, the text color selection block 342 can be configured to select a corresponding color for a textual representation of each aviation-specific weather condition based on the flight condition, rule, or other regulation associated with that condition. For example, block 342 may be configured to access or use table 10 of FIG. 10 to identify the appropriate display color (e.g., magenta, red, blue, or green) for ceiling text, visibility text, and flight category text presented on the user interface, based on corresponding flight condition information (e.g., IFR, MVFR, VFR, or LIFR).

By color-coding the textual representations for ceiling, visibility, and flight category data according to their corresponding flight conditions, the weather forecast user interface is able to instantly convey flight condition information to a user, even before the user has read the displayed text. For example, if a large amount of red or magenta text is visible on the user interface, the user can readily discern that the weather conditions during the displayed time period are unsuitable for flying (e.g., as shown in FIG. 5A). Likewise, if a large amount of green text is visible on the user interface, the user can readily discern that the weather conditions for the displayed time period are suitable for flying (e.g., as shown in FIG. 4A). Thus, the color-coded text display enables the user to intuitively identify potentially unsuitable flight conditions. At the same time, the weather forecast user interface offers detailed aviation-specific weather information for the displayed time period, so that the user can see, for themselves, why the flight conditions may be unsuitable.

Referring back to FIG. 3, the flight condition graphics block 344 can be configured to graphically represent one or more aviation-specific weather conditions received from block 316 using similar color-coding techniques, but in a more compact format. In embodiments, the flight condition graphics block 344 can be configured to generate a color-coded flight condition graphic for presentation on the weather forecast user interface, in addition to the color-coded textual representations presented by block 342. Moreover, the flight condition graphics block 344 can generate the flight condition graphic using the same color code or scheme as the text color selection block 342, such that the overall presentation of flight conditions is intuitive and consistent throughout the weather forecast user interface. For example, the flight condition graphic selection block 344 may be configured to use the color code shown in table 10 of FIG. 10 to represent flight category data 330 within the flight condition graphic.

In addition, the flight condition graphic can be configured to use color, instead of text, to symbolize the flight category 330 associated with each hour of a select time period. In embodiments, the flight condition graphic may comprise a plurality of uniform blocks or regions for respectively representing a plurality of hours included in the selected time period, and each block may be presented in an appropriate color (e.g., magenta, red, blue, or green) based on the flight category (e.g., LIFR, IFR, MVFR, or VFR) in effect for the corresponding hour. For example, the select time period represented by the flight condition graphic may include a plurality of calendar days, and each color-coded block may be configured to represent a respective hour of the plurality of calendar days (e.g., as shown in FIGS. 4A and 4B). In some cases, the color-coded blocks corresponding to a given day may be grouped together within a distinct section or zone of the flight condition graphic. In such cases, the flight condition graphic may comprise a plurality of color-coded sections, each section corresponding to a respective one of the plurality of calendar days displayed on the user interface. Thus, by applying the above techniques, the flight condition graphic can be configured to present hourly flight category data for a large period of time (e.g., several days) as informative blocks of color that can be readily understood at a glance.

While specific examples are provided herein, other arrangements and configurations of the flight condition graphic are also contemplated. For example, in some embodiments, each block of the flight condition graphic may be configured to represent a different length of time, such as, for example, three, six, or twelve hour intervals of a given calendar day, etc. Also, in some embodiments, the flight condition graphics block 344 may use other types of color-coding, shading, or styling schemes to generate the flight condition graphic. In still other embodiments, the block 344 may generate the flight condition graphic based on other types of aviation-specific weather conditions, such as, for example, the ceiling data 326 and/or the visibility data 328.

Thus, the system 300 can be configured using color-coding and other graphical techniques described herein to provide a weather forecast user interface that can immediately and intuitively convey the suitability or unsuitability of flight conditions across a displayed period of time (e.g., several days and/or several hours within a selected day).

In the following paragraphs, exemplary graphical user interfaces (GUIs) for implementing various aspects of the weather forecast user interface provided by system 300 will be described with reference to FIGS. 4A through 6B. In addition, exemplary graphical user interfaces for implementing one or more other user interfaces used in conjunction with the weather forecast user interface (e.g., as part of the flight planning software application) will be described with reference to FIGS. 7A through 8B. In embodiments, one or more of these GUIs may be generated or provided by the system 300 and displayed on a display screen of the client device 102 for presentation to the user, as described herein. While the illustrated embodiments depict GUIs with particular shapes and sizes configured for presentation on various mobile computing device, such as, e.g., a tablet, a smartphone, or the like, it is contemplated that the techniques described herein can also be used to provide GUIs having other formats or configurations to accommodate other types of electronic devices and/or display screen sizes, such as, for example, personal computers, laptops, stand-alone display screens, televisions and other media devices. Also, it should be appreciated that the graphical user interfaces shown herein are merely exemplary and can comprise various other details, arrangements, and/or selectable options.

Referring now to FIG. 4A, shown is a first graphical user interface 400 for presenting aviation-focused weather information for a select time period and location on a first electronic device, such as, but not limited to, a tablet or other mobile computing device. FIG. 4B illustrates a second graphical user interface 450 for similarly presenting aviation-focused weather information for a select time period and location, but on a second electronic device, such as a smart phone or other smaller mobile computing device. The following paragraphs will focus on various aspects of the first graphical user interface ("GUI") 400 for the sake of brevity; however, it should be understood that similar features are also present in the second GUI 450, albeit in a smaller or narrower format. FIGS. 5A and 5B also illustrate the first GUI 400, except the displayed weather information corresponds to a different location and time than FIG. 4A.

As depicted in FIG. 4A, the first GUI 400 comprises a banner 401 positioned across a top of the GUI 400 and configured to display the select location, or the location for which weather information is displayed. In the present case, the select location is a set of geographical coordinates. Other types of location information may also be displayed in banner 401, such as, but not limited to, an airport name (e.g., Chicago O'Hare International Airport or "KORD" as shown in FIG. 5A), a waypoint name, a city, and the like.

The first GUI 400 also comprises several regions for displaying the weather information in different formats and across different timeframes associated with the select time period. In particular, a first or daily region 402 can be configured to display summarized general weather information for a first group of consecutive calendar days (e.g., December 8$^{th}$ through 14$^{th}$) included in the select time period. As an example, the general weather information displayed for each calendar day in the daily region 402 may include temperature information (e.g., temperature high and low) and a weather icon representing the overall general weather conditions expected for that day, as shown. The weather icon may be selected by the weather icon selection block 348 of system 300.

The first GUI 400 also comprises a second or hourly region 404 configured to present aviation-focused weather information for a plurality of consecutive hours included in the select time period. In embodiments, the select time period includes the first group of calendar days shown in the daily region 402, and the plurality of hours displayed in the hourly region 404 are included in that group of calendar days. For example, the hourly region 404 can be configured to display a first plurality of hours (e.g., 1 PM to 10 PM) from a select one of the calendar days in the first group (e.g., Dec. 8, 2020). According to embodiments, the aviation-focused weather information displayed for each hour in the hourly region 404 may include text stating or listing several general weather conditions, such as, for example, wind information, temperature information, and precipitation data, as well as a weather icon for representing the overall weather conditions for that hour, and a rain or precipitation icon for representing a chance of precipitation for the hour, as shown. As also shown in FIG. 4A, the aviation-focused weather information displayed in the hourly region 404 may further include text stating or listing aviation-specific weather conditions, such as, for example, ceiling information, visibility information, and flight category data. The weather icons shown in the hourly columns 408 may be selected by the weather icon selection block 348 of system 300, and the precipitation icons shown in the hourly columns 408 may be selected by the rain icon selection block 346 of system 300, for example.

In the illustrated embodiment, the daily region 402 comprises a plurality of user-selectable boxes or segments 406 arranged adjacent to each other, and each box 406 (or "daily box") corresponds to a respective one of the calendar days in the first group. As also shown, the hourly region 404 comprises a plurality of user-selectable columns or segments 408 arranged adjacent to each other, and each column 408 (or "hourly column") corresponds to a respective one of the first plurality of hours. According to various embodiments, a user may interact with one or more of the hourly columns 408 and the daily boxes 406 to change the date and/or hour presently on display and thus, view weather information for a new timeframe. The selected calendar day may be indicated by graphically highlighting, or otherwise differentiating, the daily box 406 that corresponds to the selected day (e.g., "Tue 8" box in FIG. 4A). Similarly, a selected hour may be indicated by graphically highlighting, or otherwise differentiating, the hourly column 408 that corresponds to the selected hour (e.g., "1 PM" box in FIG. 4A).

In some cases, the hour may be automatically selected depending on the time period selected for display on the GUI 400. For example, in the case of a future point-in-time, the selected hour may be automatically set to 8 AM of the calendar day that corresponds to the future point-in-time (e.g., as shown in FIG. 5A). In the case of a current point-in-time, the selected hour may be automatically set to the hour that corresponds to the current point-in-time (e.g., 1 PM, as shown in FIG. 4A).

As shown, the GUI 400 further includes a third or detailed hour region 410 configured to present detailed aviation-focused weather information for the selected hour, or the hour represented by the selected hourly column 408 (e.g., 1 PM in FIG. 4A). As will be appreciated, the information displayed in the detailed hour region 410 may change each time the user selects a different hourly column 408 and/or a different daily box 406.

In embodiments, the detailed hour region 410 comprises a plurality of data fields 412 for presenting the aviation-focused weather information as plain text. As shown, each data field 412 may be assigned to a particular piece or type of weather information, and the data fields 412 may be arranged so that key aviation-specific weather conditions are shown at a top of the region 410. The detailed hour region 410 also includes a weather icon for representing the overall weather conditions expected for the selected hour (e.g., using the weather icon selection block 348 of system 300). As shown, the weather icon displayed in the detailed hour region 410 may be the same as the weather icon displayed in the corresponding hourly column 408.

According to embodiments, some of the data fields 412 display the same weather information shown in the corresponding hourly column 408, or a more detailed version of that weather information. Other data fields 412 display weather conditions that are not shown in the hourly columns 408. For example, the information displayed in region 410 may include additional aviation-specific weather information that is not shown in the hourly region 404, such as altimeter information, density altitude data, and any other aviation-specific weather information received at block 316 of system 300. Similarly, the information displayed in region 410 may include additional general weather information that is not shown in the hourly region 404, such as dewpoint and humidity data and any other general weather information received at block 318 of system 300, for example.

In embodiments, each of the hourly region 404 and the daily region 402 can be configured to display a different or additional group of segments (i.e. additional hours or days, respectively) in response to receiving an appropriate user input or other user interaction. In some embodiments, each region 402 and 404 may be scrollable, or movable in a continuous, rolling manner relative to the overall GUI 400, to reveal additional days or hours, respectively. For example, in the illustrated embodiment, the hourly columns 408 and the daily boxes 406 are arranged vertically and are horizontally scrollable. That is, the user can view additional hours or days by swiping left or right across the corresponding region, for example, while interacting with the GUI 400 on a touchscreen. Moreover, each of the daily region 402 and the hourly region 404 may be independently controllable, such that scrolling across one region does not change the information visible in the other region.

FIGS. 5A and 5B illustrate an exemplary scrolling operation of the GUI 400, in accordance with embodiments. In FIG. 5A, the GUI 400 is configured to present aviation-focused weather information for a first interval or set of hours (e.g., 12 AM to 9 AM) for a selected day (e.g., Dec. 17, 2020). The first time interval may be determined based on a time input that indicates the selected day and is received through the GUI 400 or another user interface of system 300 (e.g., GUIs 600 and 650 shown in FIGS. 6A and 6B). For example, in the former case, the time input may be received upon user selection of the appropriate daily box 406. In FIG. 5B, the first time interval displayed in the hourly region 504 of FIG. 5A has been replaced by a second time interval comprising a second set of hours (e.g., 8 AM to 5 PM) from the same day. The user may navigate to the second time interval by scrolling through the hourly columns 408 until a second set of columns is visible in place of the first set of columns.

In the illustrated embodiments, the user can scroll forwards or backwards through the hourly region 404 without making any new selections or otherwise changing which date and hour are currently selected. For example, as shown in FIG. 5B, the selected hourly column 408 (e.g., 8 ΔM) remains the same, or untouched, as the user scrolls to the second set of columns. As a result, the detailed hour region 410 also remains the same, displaying the same detailed weather information shown in FIG. 5A (i.e. for the selected hour 8 AM). In other embodiments, the selected hour may automatically update or change as the user scrolls into new time intervals and/or the initially selected hour is no longer visible.

While the illustrated embodiments show vertically-arranged daily and hourly segments, in other embodiments, the daily and/or hourly segments may be arranged horizontally and may be vertically scrollable, such that the user must swipe up or down across the corresponding region to view additional segments. Also, while the examples provided herein refer to user interactions with a touchscreen of the electronic device to control the display of weather information, it should be appreciated that other types of user inputs or interactions can be used, including, but not limited to, rotation of a scrollable input device of the electronic device or a periphery coupled thereto (e.g., a mouse, keyboard, etc.), a touchless or gesture-based interaction with the electronic device, and the like. Similarly, other techniques for scrolling or moving through the regions 402 and/or 404 are also contemplated, including, but not limited to, user-selectable arrows disposed at one or more edges of the region to move the displayed area left, right, up, or down and the like.

In embodiments, the aviation-specific weather conditions displayed in the hourly region 404 and/or the detailed hour region 410 may be color-coded based on the flight condition associated with each (e.g., using the text color selection block 342 of system 300). For example, in FIG. 4A, the text for presenting ceiling, visibility, and flight category information in data fields 412 and hourly columns 408 is displayed in green because the corresponding flight conditions (e.g., VFR) are good or clear for flying. In other cases, the text may be various other colors (e.g., magenta, red, or blue) depending on the corresponding flight conditions, for example, as shown in table 10 of FIG. 10. In some embodiments, precipitation information displayed in the hourly region 404 and the detailed hour region 410 may also be color-coded to depict a percentage or chance of precipitation excepted for the displayed time and location (e.g., using rain icon selection block 346 of system 300). For example, the precipitation information may be displayed in blue text (e.g., as shown in FIG. 5A). Thus, the hourly region 404 and the detailed hour region 410 can be configured to convey select pieces of weather information in two layers: as plain text stating the actual weather condition and via color-coding associated with that condition.

As illustrated, the GUI 400 further comprises a fourth or flight condition region 414 configured to graphically present one or more aviation-specific weather conditions for the select time period using a color-coding, shading, or styling scheme associated with the information, such as, e.g., the flight condition-based color code shown in table 10 of FIG. 10. In embodiments, the flight condition region 414 comprises a flight condition graphic 416 (also referred to herein as a "color bar") configured to provide a color-coded, color-based summary of the flight category information for each calendar day included in the select time period (e.g., using the flight condition graphics block 344 of system 300). For example, the flight condition graphic 416 may comprise, or be divided into, a plurality of uniformly-sized segments 418 (also referred to herein as "graphical elements"), and each segment 418 may represent or symbolize the flight category information for a respective one of the displayed calendar days using corresponding colors.

In some embodiments, each segment 418 comprises, or is made up of, a plurality of uniformly-sized blocks or sections, and each block is configured to represent a respective hour, or other time interval, of the corresponding day. The blocks are colored based on the flight category information associated with the corresponding hour. As a result, a given segment 418 may have a plurality of different colored blocks, for example, if the flight category condition varies throughout a given day (e.g., as shown by the multi-color segments in FIG. 4B). Alternatively, all of the blocks in a given segment 418 may be the same color, for example, if the flight category remains the same throughout a given day (e.g., as shown by the all-green segments in FIG. 4A).

Through these techniques, the flight condition graphic 416 can compactly convey detailed flight category information for a large time period (e.g., seven calendar days) without relying on any text. During use, based on the flight condition graphic 416 alone, a user can readily determine whether a given calendar day, as a whole, is suitable or unsuitable for flying. The user can also use the graphic 416 to determine if there are specific intervals during a given calendar day that are suitable or unsuitable for flying (e.g., morning, mid-day, evening, etc.). In some cases, a user looking to plan a flight during the displayed time period can first view, or glance at, the flight condition graphic 416 and based thereon, can instantly decide whether further weather details are needed for one of the displayed calendar days. If they are, the user may click on the box 406 corresponding to the desired calendar day to view hourly weather information for that day. Based on the displayed hourly information, the user can then decide whether even more detailed weather information is needed for one of the displayed hours. If it is, the user can click on the hourly column 408 that corresponds to the desired hour to view detailed weather information for that hour. In this manner, a user can selectively interact with the weather forecast user interface, or GUI 400, to obtain a desired amount of aviation-focused weather information for a given time period and location.

As illustrated, the flight condition region 414 may be disposed under the daily region 402 and correspondingly aligned, such that each of the segments 418 is positioned directly under the daily box 406 that represents the same calendar day. Positioning the two regions 402 and 414 in this manner creates an overall summary of each day's weather information, both general and aviation-specific, that can be easily or intuitively digested at a glance. In other embodiments, however, the regions 402 and 414 may be arranged separately or differently, as will be appreciated. Similarly, while the illustrated embodiment show the daily region 402, the hourly region 404, and the detailed hour region 410 as being stacked on top of each other in a particular order, other arrangements are also contemplated, including, for example, a different stacking order for the regions, two regions disposed side-by-side, etc.

Referring now to FIG. 6A, shown is a first graphical user interface 600 configured to present general weather information for a plurality of calendar days in summarized form on a first electronic device, such as, but not limited to, a tablet or other mobile computing device. In addition, FIG. 6B illustrates a second graphical user interface 650 configured to similarly present general weather information for a plurality of calendar days, but on a second electronic device, such as a smart phone or other smaller mobile computing device. In some embodiments, the system 300 can be configured to provide the GUIs 600 and 650 as part of the weather forecast user interface or as a second user interface associated therewith (e.g., using the graphics engine 306). In other embodiments, the GUIs 600 and 650 may be presented as part of the flight planning software application on the respective electronic device. The following paragraphs will primarily focus on various aspects of the second GUI 650 for clarity and brevity reasons. However, it should be understood that similar features are also present in the first GUI 600, as shown in the figures.

As illustrated in FIG. 6B, GUI 650 (also referred to therein as a "daily weather forecast user interface") comprises a plurality of sections or rows 602, each section 602 configured to graphically present a summary of the general weather conditions associated with a respective one of the plurality of calendar days. Moreover, each section 602 (also referred to herein as "daily summary") may be user-selectable, for example, upon receiving a user input or other interaction associated with the section 602 itself, or an interactive component thereof (e.g., icon, button, etc.). In embodiments, selection of a given daily summary 602 may represent selection of the corresponding day, and the selected day may be provided to the system 300 as a time input 308. In response, the system 300 may generate the weather forecast user interface (e.g., GUI 400) using the graphics engine 306 and aviation-focused weather information obtained by the information module 304 for the selected day. In some embodiments, for example, in the case of GUI 600, the weather forecast user interface may be placed on top of, or partially overlapping, the GUI 600. In other embodiments, for example, in the case of GUI 650, the weather forecast user interface may replace, or be presented in place of, the GUI 650, for example, as shown by GUI 450 in FIG. 4B.

According to embodiments, the daily summaries 602 can be scrollable, or otherwise movable in a continuous, rolling manner relative to the overall GUI 650, in order to reveal additional calendar days. For example, in the illustrated embodiment, the daily summaries 602 are arranged adjacent to each other and stacked vertically, or on top of each other. In such cases, a user can view additional days by swiping up or down across the GUI 650 or otherwise interacting with the GUI 650 so that the daily summaries 602 move vertically. As will be appreciated, other types of scrolling operations (e.g., swiping to the left or right across the GUI 650) may be appropriate if the daily summaries 602 are arranged in a different configuration, such as, e.g., side by side, in columns, or as individual boxes or other graphical elements.

As shown, each daily summary 602 can be configured to present daytime weather conditions in a first area 604 (also referred to herein as a "daytime area") of the section 602 and to present nighttime weather conditions in a second area 606 (also referred to herein as a "nighttime area") of the section 602. In the illustrated embodiment, the daytime area 604 and nighttime area 606 are presented side by side, or in separate columns. In other embodiments, the areas 604 and 606 may be presented as separate rows, i.e. extending horizontally across the screen, or in any other suitable configuration.

According to embodiments, the daytime weather conditions may include the general weather conditions expected for a first period of time extending from about sunrise to sunset, and the nighttime weather conditions may include the general weather conditions expected for a second period of time extending from about sunset to sunrise. Moreover, each area 604 and 606 may include sunrise or sunset information, respectively (e.g., from the sunset and sunrise times block 320 of system 300), general weather conditions, such as temperature information and precipitation information (e.g., from the general weather conditions block 318 of system 300), one or more weather icons to symbolize overall weather conditions for the corresponding period of time (e.g., from the weather icon selection block 348 of system 300), and a precipitation icon to convey whether a chance of precipitation is above a preset threshold (e.g., from the rain icon selection block 346 of system 300). As will be appreciated, other types of weather information may be displayed in each daily summary 602 instead of, or in addition to, the information described herein.

Referring now to FIG. 7A, shown is a first graphical user interface 700 configured to present a group of airports 702 and enable user selection of a given airport 702 for requesting weather information associated therewith, the first GUI 700 being displayed on a first electronic device, such as, but not limited to, a tablet or other mobile computing device. In addition, FIG. 7B illustrates a second graphical user interface 750 configured to similarly present a group of airports 752, but on a second electronic device, such as a smart phone or other smaller mobile computing device. In some embodiments, the system 100 of FIG. 1 may be configured to provide the GUIs 700 and 750 as part of the flight planning software application on the respective electronic device. The following paragraphs will primarily focus on various aspects of the first GUI 700 for clarity and brevity reasons. However, it should be understood that similar features are also present in the second GUI 750, as shown in the figures.

In some cases, the group of airports 702 may be selected based on a nearest flight service station and/or a currently detected location of the user, or the associated electronic device. For example, the group of airports 702 may represent all airports within a certain distance (e.g., numbers of miles or kilometers) or flying range (e.g., number of minutes) of a current location. In other cases, the group of airports 702 may be selected based on other location information entered by the user via the GUI 700 or other interface of the flight planning software application, for example.

As shown, the group of airports 702 may be presented within the GUI 700 as a list 704 of user-selectable options, or any other suitable format for graphically and interactively representing each of the airports 702 (e.g., graphical icons arranged in a tiled format, etc.). In some embodiments, the list 704 may be scrollable, or otherwise movable in a continuous, rolling manner relative to the overall GUI 700, in order to reveal additional airports 702 from the same group, similar to the list of daily summaries 602 described herein, for example. In various embodiments, selection of a given airport 702 represents a request for weather information about the corresponding airport 702. In response, information pertaining to the selected airport 702 may be provided to the system 300 as a location input 310, and the system 300 may generate the weather forecast user interface (e.g., GUI 500) using the graphics engine 306 and aviation-focused weather information obtained by the information module 304 for the selected airport 702. In some embodiments, for example, in the case of GUI 700, the resulting weather forecast user interface may be placed on top of, or partially overlapping, the GUI 700. In other embodiments, for example, in the case of GUI 750, the resulting weather forecast user interface may replace, or be presented in place of, the GUI 750, for example, as shown by GUI 450 in FIG. 4B.

In embodiments the GUI 700 may also include a graphical element for requesting local weather information. In some cases, the local weather information may correspond to weather information for a local flight service station or the station that is closest to the user's current location (also referred to as "station local"). In other cases, the local weather information may correspond to weather information for a currently detected location of the user or associated electronic device.

As shown, the graphical element 706 may be presented as a user-selectable icon or other graphic labeled "Local Wx," or any other appropriate symbol or term (e.g., Local Weather, etc.) for indicating an option to view the local weather information. Upon selection of the graphical element 706 (also referred to herein as "Local WX icon"), information identifying the local flight service station or currently detected location of the user may be provided to the system 300 as a location input 310 and a corresponding weather forecast user interface may be generated and presented on the display screen as described above.

Referring now to FIG. 8A, shown is a first graphical user interface 800 configured to present an interactive map 802 for enabling a user to request weather information for a location selected on the map 802, the first GUI 800 being displayed on a first electronic device, such as, but not limited to, a tablet or other mobile computing device. FIG. 8B illustrates a second graphical user interface 850 configured to similarly presenting a map 852, but on a second electronic device, such as a smart phone or other smaller mobile computing device. In some embodiments, the system 100 of FIG. 1 may be configured to provide the GUIs 800 and 850 as part of the flight planning software application on the respective electronic device. The following paragraphs will focus on various aspects of the first GUI 800 for the sake of brevity; however, it should be understood that similar features are also present in the second GUI 850, as shown in the figures.

According to embodiments, the map 802 is configured to graphically, or pictorially, depict a select area comprising a plurality of geographic locations and enable user selection of any one of the locations 804 displayed on the map. The locations 804 may include, for example, a city, waypoint, airport, landmark, set of coordinates, a currently detected location of the user, a nearby flight service station, or any other point on the map 802. In response, the GUI 800 can be configured to display a location user interface or window 806 for presenting additional information about the selected map location 804, as shown.

In embodiments, a graphical element 808 may be presented within the window 806 to provide a user-selectable option to view weather information for the selected location 804. For example, the graphical element 808 may be an icon or other graphic labeled "Wx," as shown, or have any other appropriate symbol or term (e.g., Wx Forecast, Weather, etc.). Upon selection of the graphical element 808, information identifying the corresponding location 804 may be provided to the system 300 as a location input 310 for requesting weather information about the map location 804. In response, the system 300 may generate the weather forecast user interface (e.g., GUI 400) using the graphics engine 306 and aviation-focused weather information obtained by the information module 304 for the selected location 804. In some embodiments, the system 300 can be configured to obtain aviation-focused weather information for any and all locations selected via the map 802, including worldwide locations and locations that are not close to an airport, waypoint, city, or other landmark. In such cases, the GUI 800 can be configured to allow a user to precisely select any desired location using the map 802.

In some embodiments, for example, in the case of GUI 800, the weather forecast user interface may be placed on top of, or partially overlapping, the GUI 800. In other embodiments, for example, in the case of GUI 850, the weather forecast user interface may replace, or be presented in place of, the GUI 850, for example, as shown by GUI 450 in FIG. 4B.

FIG. 9 illustrates an example process or method 900 for assessing and presenting aviation-focused weather information to a user using an electronic device, in accordance with embodiments. The method 900 can be carried out by the electronic device, alone or in combination with one or more other computing devices. Said device(s) may include, for example, computing device 200 shown in FIG. 2 and/or one or more computing devices of the system 100 shown in FIG. 1. The functionalities of the method 900 can be implemented, at least in part, by a processor of the electronic device (e.g., processor 202 shown in FIG. 2) executing a software application stored in a memory (e.g., memory 204 shown in FIG. 2). In embodiments, the software application may be the aviation-focused weather forecasting application, or a portion thereof, as described with reference to system 300 of FIG. 3. In some embodiments, the application may be a computer program stored on a non-transitory computer readable medium that is executable by a processor of the device.

To further carry out the operations of method 900, the electronic device can interact or interface with one or more external devices communicatively coupled thereto, such as, for example, a remote server (e.g., remote server 104 in FIG. 1), as well as employ one or more internal devices, such as, e.g., a display unit (e.g., display screen 206 shown in FIG. 2). For example, upon carrying out the method 900, the processor can cause the display screen to display one or more graphical user interfaces, including the weather forecast user interface (e.g., one or more of the graphical user interfaces shown in FIGS. 4A through 8B). As another example, the data associated with, or presented by, the graphical user interfaces can be retrieved from the remote server and/or one or more databases (e.g., storage device 108 in FIG. 1).

In embodiments, the method 900 includes two groups of steps that operate in parallel, or independently of each other. For example, the two groups may be carried out simultaneously, in quick succession, or during partially overlapping time periods. As shown, the first group of steps includes steps 902, 904, and/or 906 for determining a select geographic location, while the second group includes steps 908, 910, and/or 912 for determining a select time period. In some embodiments, the exact order of the steps 902 through 912 may vary depending on how the time and location information is received. For example, in some cases, the location information will stay constant while the time information changes. In other cases, at least one of the time information and the location information may be automatically determined, without relying on a user input (e.g., as in steps 904 and 910) or a separate user interface (e.g., as in steps 902 and 908). Other combinations and arrangements of the steps 902 through 912 are also contemplated. Thus, while the following paragraphs describe each of steps 902 through 912 in detail, it should be understood that some embodiments may include fewer steps.

Step 902 includes displaying, on the display unit, a geographic map user interface configured to present a plurality of geographic locations. For example, in embodiments, the geographic map user interface may comprise an interactive map configured to graphically depict the plurality of geographic locations and enable selection of a select geographic location on the map, or via a user interaction with the map (e.g., as shown by selected location 804 on map 802 of GUI 800 in FIG. 8A).

Step 904 includes receiving a location input indicating a select geographic location, or including information identifying the select geographic location (e.g., like the location input 310 shown in FIG. 3). In some cases, the method 900 continues from step 902 to step 904 upon detecting or receiving user selection of a map location via the geographic map user interface, for example, as shown in FIG. 9. In such cases, the location input may include the user-selected map location as the select geographic location.

In other cases, the method 900 may not include step 902 and thus, the location input may not be obtained via the geographic map user interface. Instead, at step 904, the location input may be any type of location input received from various other sources. For example, the location input may include, as the select geographic location, a nearest flight service station or a currently detected geographic location of the user, which may be automatically determined based on GPS information of the electronic device (e.g., upon selecting the "Local Wx" icon 706 in FIG. 7A). As another example, the location input may include, as the select geographic location, an airport selected from a list of airports in a given area (e.g., as shown in list 704 of GUI 700 in FIG. 7A). In another example, the location input may include, as the select geographic location, a waypoint, city, set of coordinates, or other location entered or selected by the user using one or more other user interfaces associated with the flight planning software application.

Step 906 includes determining a select geographic location for the weather forecast user interface. In some embodiments, step 906 includes determining the select location based on the location input received at step 904, as shown in FIG. 9. For example, at step 906, the processor may process the location input to identify or extract the location information contained therein, convert the received information to a usable format (e.g., latitude and longitude coordinates corresponding to a received airport code, waypoint, etc.), or otherwise identify the select location based on the location input. In other embodiments, for example, where the method 900 does not include steps 902 and 904, the select geographic location may be automatically determined at step 906 based on preset or stored location information, such as, e.g., a default home location, a previously-used location, or other location information that is not selected or entered by the user.

Step 908 includes displaying, on the display unit, a daily weather forecast user interface configured to present general weather information for a plurality of consecutive calendar days. For example, in embodiments, the daily weather forecast user interface may comprise a plurality of user-selectable rows, each row being configured to graphically depict general weather information for a respective day (e.g., as shown by daily summaries 602 of GUI 600 in FIG. 6A).

Step 910 includes receiving a time input indicating a select time period, or including information identifying the select time period (e.g., like the time input 308 shown in FIG. 3). In some cases, the method 900 continues from step 908 to step 910 upon detecting or receiving user selection of one of the calendar days via the daily weather forecast user interface, for example, as shown in FIG. 9. In such cases, the time input may include the user-selected calendar day as the selected time period, or a portion thereof. The user-selected day may be correspond to a current point-in-time (e.g., the current calendar date) or a future point-in-time (e.g., a future calendar date).

In other cases, the method 900 may not include step 910 and thus, the time input may not be obtained via the daily weather forecast user interface. Instead, at step 908, the time input may be any type of time input received from various other sources. For example, the time input may include a future point-in-time selected via the weather forecast user interface (e.g., upon selecting one of the hourly columns 408 and/or daily boxes 406 in FIG. 4A). As another example, the time input may include a current point-in-time (e.g., the current day and/or hour), which may be automatically received after a user requests local weather information (e.g., upon user selection of the "Local Wx" icon 706 in FIG. 7A).

Step 912 includes determining a select time period for the weather forecast user interface. The select time period comprises a plurality of consecutive hours (e.g., as shown by the hourly region 404 in FIGS. 5A and 5B). In some cases, the plurality of consecutive hours are included in, or span across, a plurality of calendar days (e.g., as shown by the daily region 402 in FIG. 4A).

In some embodiments, step 912 includes determining the select time period based on the time input received at step 910, or more specifically the point-in-time included therein, as shown in FIG. 9. In such cases, the select time period may include a plurality of consecutive calendar days with a first one of the calendar days including the point-in-time indicated by the time input. As an example, at step 912, the processor may process the time input to identify or extract the current or future point-in-time contained therein, calculate the select time period based on the point-in-time and a preset number of days or hours (e.g., a period of 10 days starting at the point-in-time, etc.), or otherwise identify the select time period based on the time input.

In other embodiments, for example, where the method 900 does not include steps 908 and 910, the select time period may be automatically determined at step 912 based on a current point-in-time, or other time information not selected by the user. In such cases, the select time period may include a plurality of consecutive calendar days with a first one of the calendar days including the current point-in-time, and the processor may use operations similar to those described above to calculate the select time period based on the point-in-time and the preset number of days or hours (e.g., a period of 10 days starting at the point-in-time, etc.).

From steps 906 and/or 912, the method 900 continues to step 914, which includes receiving, at one or more processors, weather information for the select geographic location from step 906 and the select time period from step 912. The weather information can include general weather conditions and aviation-specific weather conditions for each of the hours. The general weather conditions can include dew point and humidity information, wind information, temperature information, precipitation information, and/or others (e.g., as shown by block 318 of FIG. 3). The aviation-specific weather conditions can include ceiling information, visibility information, density altitude information, flight category information, and/or others (e.g., as shown by block 316 of FIG. 3). The weather information may be retrieved from one or more components, such as, for example, a remote server, a database or other storage device, a local cache or other memory, and others.

Step 916 includes determining a flight category for each hour included in the select time period based on the ceiling information and visibility information for that hour. In some embodiments, the aviation-specific weather conditions received at step 914 may not include flight category information. In such cases, the processor calculates the flight category information by assessing the ceiling and visibility information and determining corresponding flight condition information for each (e.g., using the table 10 shown in FIG. 10), and assigning the worst of the two flight conditions as the flight category for the same hour (e.g., as described for flight category 330 shown in FIG. 3). In other embodiments, the flight category information may be received along with the ceiling and visibility information as part of the aviation-specific weather conditions. In such cases, step 916 may include assessing the receive information to extract flight category information therefrom.

Step 918 includes displaying, on the display unit, a weather forecast user interface configured to present the weather information received at step 914 (e.g., GUI 400 of FIG. 4A). According to embodiments, the weather forecast user interface can comprise a first region configured to depict one or more of the aviation-specific weather conditions for each hour of the select time period using color-coding or shading associated with the corresponding aviation-specific weather condition (e.g., flight condition region 414 shown in FIG. 4A). The color-coding or shading used in the first region may be configured to indicate a flight category in effect at the select geographic location during the given hour based on the corresponding aviation-specific weather condition (e.g., using the color code shown in table 10 of FIG. 10). The first region may comprise a plurality of graphical elements (e.g., segments 418 shown in FIG. 5A), wherein each graphical element is configured to depict the one or more of the aviation-specific weather conditions for a respective one of the calendar days using color-coding or shading associated with the corresponding aviation-specific weather condition.

In some embodiments, the weather forecast user interface further comprises a second region configured to present a first subset of the weather information for each calendar day (e.g., daily region 402 shown in FIG. 4A). In such cases, the weather forecast user interface may be configured to display the second region adjacent to and in alignment with the first region, such that each graphical element is aligned with the first subset of weather information corresponding to the same day (e.g., as shown by segments 418 of flight condition graphic 416 and daily boxes 406 in FIG. 5A).

In some embodiments, the weather forecast user interface further comprises a third region configured to present a second subset of the weather information for each hour of the select time period (e.g., as shown by hourly region 404 in FIG. 4A). In such cases, the third region can comprise color-coded textual representations of the aviation-specific weather conditions for each hour. In embodiments, the textual representations may use the same color-coding that is used in the first region to color-code the flight category information. The weather forecast user interface may also comprise a fourth region configured to present detailed aviation-specific weather information and general weather information for a selected one of the plurality of hours (e.g., detailed hour region 410 shown in FIG. 4A).

Thus, the techniques described herein provide a graphical user interface (GUI) configured to present aviation-focused weather information for a select time and location in an intuitive and readily discernible manner. For example, a weather forecast user interface described herein is configured to display the weather information at varying levels of informational detail, wherein the most detailed region covers a very short time frame (e.g., only one hour) using plain text, and the broadest region covers a much larger time frame (e.g., each hour included in a plurality of calendar days) using only color-coding configured to depict suitable and unsuitable flight conditions for each hour of the large time frame. This graphical layout is further configured to enable the user to control which day and/or hour are displayed in more detail (e.g., via user-selectable elements) and quickly scan the displayed days and hours for suitable flight conditions (e.g., via color-coding and scrollable elements). Embodiments also include a system configured to assess the aviation-focused weather information, identify one or more aviation-specific weather conditions (e.g., flight category) based on the assessed information, and provide the identified aviation-specific weather conditions to the graphical user interface for color-coded presentation, as described above.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Any process descriptions or blocks in the figures, such as, e.g., FIG. 9, should be understood as representing modules, segments, or portions of code that include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

What is claimed is:

1. A computer-implemented method for graphically presenting aviation-focused weather information, the method comprising:
   receiving, at one or more processors, weather information for a select geographic location and a select time period, the select time period comprising a plurality of consecutive hours, and the weather information including general weather conditions and aviation-specific weather conditions for each of the hours;
   displaying, on a display unit of an electronic device, a weather forecast graphical user interface configured to graphically present the weather information in one or more interactive regions, wherein the one or more interactive regions comprises:
      a first interactive region configured to graphically depict one or more of the aviation-specific weather conditions in association with each hour of the select time period using color-coding or shading assigned to the corresponding aviation-specific weather condition,
      a second interactive region configured to graphically present a first subset of the weather information in association with each of a plurality of consecutive calendar days included in the select time period, the second interactive region being displayed adjacent to and in alignment with the first interactive region, such that each graphical element of the first interactive region is aligned with the first subset of weather information in the second interactive region that corresponds to the same day, and
      a third interactive region configured to graphically present a second subset of the weather information in association with a first plurality of hours, the first plurality of hours corresponding to a selected one of the plurality of calendar days presented in the second interactive region; and
   responsive to user selection of a second calendar day within the second interactive region, replacing, in the third interactive region, the graphical presentation of the first plurality of hours and associated information with graphical presentation of a second plurality of hours corresponding to the second calendar day, in association with weather information for the second plurality of hours,
   wherein the color-coding or shading graphically indicates a flight category in effect at the select geographic location during the given hour based on the corresponding aviation-specific weather condition.

2. The method of claim 1, wherein the aviation-specific weather conditions include ceiling information and visibility information, the method further comprising: determining the flight category for each hour based on the ceiling information and visibility information for that hour.

3. The method of claim 1, wherein the aviation-specific weather conditions include density altitude information.

4. The method of claim 1, wherein the select time period further includes a plurality of consecutive calendar days, the plurality of consecutive hours being included in the plurality of consecutive calendar days.

5. The method of claim 4, further comprising: determining the select time period based on a current point-in-time, a first one of the consecutive calendar days including the current point-in-time.

6. The method of claim 4, further comprising:
   receiving, via the weather forecast graphical user interface, a time input indicating a future point-in-time; and
   determining the select time period based on the time input, a first one of the consecutive calendar days including the future point-in-time.

7. The method of claim 4, wherein the first interactive region comprises a plurality of graphical elements, each graphical element graphically depicting the one or more of the aviation-specific weather conditions in association with a respective one of the consecutive calendar days using the color-coding or shading assigned to the corresponding aviation-specific weather condition.

8. The method of claim 1, wherein the third interactive region comprises color-coded textual representations of the aviation-specific weather conditions for each hour.

9. The method of claim 1, further comprising:
   displaying, on the display unit, a geographic map graphical user interface configured to graphically present a plurality of geographic locations; and receiving, via the geographic map graphical user interface, a location input indicating the select geographic location.

10. The method of claim 9, wherein the geographic map graphical user interface comprises an interactive map configured to graphically depict the plurality of geographic locations and enable selection of the select geographic location via a user interaction with the map.

11. A non-transitory computer readable storage medium storing one or more programs, the one or more programs comprising instructions which, when executed by an electronic device with a display unit, cause the electronic device to:
receive weather information for a select geographic location and a select time period, the select time period comprising a plurality of consecutive hours, and the weather information including general weather conditions and aviation-specific weather conditions for each of the hours; and
display a weather forecast graphical user interface configured to graphically present the weather information in one or more interactive regions, wherein the one or more interactive regions comprises:
a first interactive region configured to graphically depict one or more of the aviation-specific weather conditions in association with each hour of the select time period using color-coding or shading assigned to the corresponding aviation-specific weather condition,
a second interactive region configured to graphically present a first subset of the weather information in association with each of a plurality of consecutive calendar days included in the select time period, the second interactive region being displayed adjacent to and in alignment with the first interactive region, such that each graphical element of the first interactive region is aligned with the first subset of weather information in the second interactive region that corresponds to the same day, and
a third interactive region configured to graphically present a second subset of the weather information in association with a first plurality of hours, the first plurality of hours corresponding to a selected one of the plurality of calendar days presented in the second interactive region; and
responsive to user selection of a second calendar day within the second interactive region, replace, in the third interactive region, the graphical presentation of the first plurality of hours and associated information with graphical presentation of a second plurality of hours corresponding to the second calendar day, in association with weather information for the second plurality of hours,
wherein the color-coding or shading graphically indicates a flight category in effect at the select geographic location during the given hour based on the corresponding aviation-specific weather condition.

12. The non-transitory computer readable storage medium of claim 11, wherein the aviation-specific weather conditions include ceiling information and visibility information, and the one or more programs further include instructions which cause the device to: determine the flight category for each hour based on the ceiling information and visibility information for the hour.

13. The non-transitory computer readable storage medium of claim 11, wherein the aviation-specific weather conditions include density altitude information.

14. The non-transitory computer readable storage medium of claim 11, wherein the plurality of consecutive hours are included within the plurality of consecutive calendar days, and the first interactive region comprises a plurality of graphical elements, each graphical element graphically depicting the one or more of the aviation-specific weather conditions in association with a respective one of the consecutive calendar days using the color-coding or shading assigned to the corresponding aviation-specific weather condition.

15. The non-transitory computer readable storage medium of claim 11, wherein the third interactive region comprises color-coded textual representations of the aviation-specific weather conditions for each hour.

16. A system for graphically presenting aviation-focused weather information, the system comprising:
a display unit configured to present information and receive one or more user inputs;
one or more processors; and
memory configured to store one or more programs,
the one or more programs being configured for execution by the one or more processors and including instructions for:
receiving, at the one or more processors, weather information for a select geographic location and a select time period, the select time period comprising a plurality of consecutive hours, and the weather information including general weather conditions and aviation-specific weather conditions for each of the hours;
displaying, on the display unit, a weather forecast graphical user interface configured to graphically present the weather information in one or more interactive regions, wherein the one or more interactive regions comprises:
a first interactive region configured to graphically depict one or more of the aviation-specific weather conditions in association with each hour of the select time period using color-coding or shading assigned to the corresponding aviation-specific weather condition,
a second interactive region configured to graphically present a first subset of the weather information in association with each of a plurality of consecutive calendar days included in the select time period, the second interactive region being displayed adjacent to and in alignment with the first interactive region, such that each graphical element of the first interactive region is aligned with the first subset of weather information in the second interactive region that corresponds to the same day, and
a third interactive region configured to graphically present a second subset of the weather information in association with a first plurality of hours, the first plurality of hours corresponding to a selected one of the plurality of calendar days presented in the second interactive region; and
responsive to user selection of a second calendar day within the second interactive region, replacing, in the third interactive region, the graphical presentation of the first plurality of hours and associated information with graphical presentation of a second plurality of hours corresponding to the second calendar day, in association with weather information for the second plurality of hours,
wherein the color-coding or shading graphically indicates a flight category in effect at the select geographic location during the given hour based on the corresponding aviation-specific weather condition.

* * * * *

UNITED STATES PATENT AND TRADEMARK OFFICE
CERTIFICATE OF CORRECTION

| | | |
|---|---|---|
| PATENT NO. | : 12,085,690 B2 | Page 1 of 1 |
| APPLICATION NO. | : 17/660766 | |
| DATED | : September 10, 2024 | |
| INVENTOR(S) | : Jason Andrew Miller et al. | |

It is certified that error appears in the above-identified patent and that said Letters Patent is hereby corrected as shown below:

In the Specification

Column 21, Line 62, Delete "ΔM)", and insert -- AM) --.

Signed and Sealed this
Seventh Day of January, 2025

Derrick Brent
*Acting Director of the United States Patent and Trademark Office*